United States Patent
Tuli

(10) Patent No.: US 8,176,428 B2
(45) Date of Patent: May 8, 2012

(54) PORTABLE INTERNET ACCESS DEVICE BACK PAGE CACHE

(75) Inventor: Raja Tuli, Montreal (CA)

(73) Assignee: Datawind Net Access Corporation, Montreal. PQ (CA)

( * ) Notice: Subject to any disclaimer, the term of this patent is extended or adjusted under 35 U.S.C. 154(b) by 2148 days.

(21) Appl. No.: 10/308,237

(22) Filed: Dec. 3, 2002

(65) Prior Publication Data

US 2004/0139208 A1 Jul. 15, 2004

(51) Int. Cl.
*G06F 3/00* (2006.01)

(52) U.S. Cl. .......................... 715/738; 715/740; 715/760

(58) Field of Classification Search .................. 715/738, 715/740, 760
See application file for complete search history.

(56) References Cited

U.S. PATENT DOCUMENTS

| | | | |
|---|---|---|---|
| 4,899,394 A | 2/1990 | Lee | |
| 5,161,213 A | 11/1992 | Knowlton | |
| 5,287,554 A | 2/1994 | Furuno | |
| 5,355,447 A | 10/1994 | Knowlton | |
| 5,379,057 A | 1/1995 | Clough et al. | |
| 5,422,656 A | 6/1995 | Allard et al. | |
| 5,444,763 A | 8/1995 | Lazaridis et al. | |
| 5,446,891 A | 8/1995 | Kaplan et al. | |
| 5,504,842 A | 4/1996 | Gentile | |
| 5,504,872 A | 4/1996 | Tanaka | |
| 5,534,893 A | 7/1996 | Hansen, Jr. et al. | |
| 5,546,524 A | 8/1996 | Chow et al. | |
| 5,546,538 A | 8/1996 | Cobbley et al. | |
| 5,555,241 A | 9/1996 | Lazaridis et al. | |
| 5,559,800 A | 9/1996 | Mousseau et al. | |
| 5,581,243 A | 12/1996 | Ouellette et al. | |
| 5,600,790 A | 2/1997 | Barnstijn et al. | |
| 5,657,345 A | 8/1997 | Lazaridis | |
| 5,682,525 A | 10/1997 | Bouve et al. | |
| 5,699,255 A | 12/1997 | Ellis et al. | |
| 5,701,451 A | 12/1997 | Rogers et al. | |
| 5,706,450 A | 1/1998 | Shaiman et al. | |

(Continued)

FOREIGN PATENT DOCUMENTS

EP 0 833 260 A2 1/1998

(Continued)

OTHER PUBLICATIONS

International Search Report, PCT/US 01/03382, 1 pages, 2001.

(Continued)

*Primary Examiner* — Simon Ke
(74) *Attorney, Agent, or Firm* — Blakely Sokoloff Taylor & Zafman LLP

(57) ABSTRACT

The present invention aims to provide a system that allows multiple users operating a PDA (Personal Digital Assistant), receiving information from a server via a cellular phone, to access the Internet or the World Wide Web (WWW), view and interact with these images remotely on a display screen. The invention relates to the priority in which packets or blocks of information are transferred to and displayed on the screen of the PDA device. The invention further relates to various methods to reduce the amount of data sent to the PDA for back pages or previously viewed web pages, stored in the cache memory of the PDA and also mirrored on the server's memory. Various algorithms may be used by the server to determine what information is to be removed from the PDA's cache memory, as it approaches its full capacity.

5 Claims, 15 Drawing Sheets

U.S. PATENT DOCUMENTS

| | | | |
|---|---|---|---|
| 5,721,908 A | 2/1998 | Lagarde et al. |
| 5,727,159 A | 3/1998 | Kikinis |
| 5,758,110 A | 5/1998 | Boss et al. |
| 5,761,663 A | 6/1998 | Lagarde et al. |
| 5,764,235 A | 6/1998 | Hunt et al. |
| 5,765,176 A | 6/1998 | Bloomberg |
| 5,768,483 A | 6/1998 | Maniwa et al. |
| 5,774,126 A | 6/1998 | Chatterjee et al. |
| 5,778,092 A | 7/1998 | MacLeod et al. |
| 5,793,964 A | 8/1998 | Rogers et al. |
| 5,802,312 A | 9/1998 | Lazaridis et al. |
| 5,809,415 A | 9/1998 | Rossmann |
| 5,810,680 A | 9/1998 | Lobb et al. |
| 5,831,679 A | 11/1998 | Montgomery et al. |
| 5,838,906 A | 11/1998 | Doyle et al. |
| 5,845,076 A | 12/1998 | Arakawa |
| 5,856,827 A | 1/1999 | Sudo |
| 5,862,348 A | 1/1999 | Pedersen |
| 5,867,662 A | 2/1999 | Riggs |
| 5,867,821 A | 2/1999 | Ballantyne et al. |
| 5,884,014 A | 3/1999 | Huttenlocher et al. |
| 5,884,056 A | 3/1999 | Steele |
| 5,893,095 A | 4/1999 | Jain et al. |
| 5,910,805 A | 6/1999 | Hickey et al. |
| 5,915,250 A | 6/1999 | Jain et al. |
| 5,923,736 A | 7/1999 | Shachar |
| 5,925,103 A | 7/1999 | Magallanes et al. |
| 5,928,324 A | 7/1999 | Sloan |
| 5,938,737 A | 8/1999 | Smallcomb et al. |
| 5,949,412 A | 9/1999 | Huntsman |
| 5,949,875 A | 9/1999 | Walker et al. |
| 5,956,716 A | 9/1999 | Kenner et al. |
| 5,961,586 A | 10/1999 | Pedersen |
| 5,961,603 A | 10/1999 | Kunkel et al. |
| 5,966,135 A | 10/1999 | Roy et al. |
| 5,968,119 A | 10/1999 | Stedman et al. |
| 5,974,441 A | 10/1999 | Rogers et al. |
| 5,978,835 A | 11/1999 | Ludwig et al. |
| 5,987,256 A | 11/1999 | Wu et al. |
| 5,995,102 A | 11/1999 | Rosen et al. |
| 5,995,105 A | 11/1999 | Reber et al. |
| 6,003,065 A | 12/1999 | Yan et al. |
| 6,006,105 A | 12/1999 | Rostoker et al. |
| 6,006,231 A | 12/1999 | Popa |
| 6,006,241 A | 12/1999 | Purnaveja et al. |
| 6,008,836 A | 12/1999 | Bruck et al. |
| 6,011,546 A | 1/2000 | Bertram |
| 6,011,905 A | 1/2000 | Huttenlocher et al. |
| 6,012,083 A | 1/2000 | Savitzky et al. |
| 6,012,086 A | 1/2000 | Lowell |
| 6,014,133 A | 1/2000 | Yamakado et al. |
| 6,014,694 A | 1/2000 | Aharoni et al. |
| 6,014,706 A | 1/2000 | Cannon et al. |
| 6,016,535 A | 1/2000 | Krantz et al. |
| 6,021,409 A | 2/2000 | Burrows |
| 6,023,749 A | 2/2000 | Richardson |
| 6,026,435 A | 2/2000 | Enomoto et al. |
| 6,034,686 A | 3/2000 | Lamb et al. |
| 6,035,281 A | 3/2000 | Crosskey et al. |
| 6,047,047 A | 4/2000 | Aldridge et al. |
| 6,049,539 A | 4/2000 | Lee et al. |
| 6,049,821 A | 4/2000 | Theriault et al. |
| 6,049,831 A | 4/2000 | Gardell et al. |
| 6,052,130 A | 4/2000 | Bardon et al. |
| 6,052,676 A | 4/2000 | Hekmatpour |
| 6,054,985 A | 4/2000 | Morgan et al. |
| 6,057,857 A | 5/2000 | Bloomfield |
| 6,065,057 A | 5/2000 | Rosen et al. |
| 6,065,800 A | 5/2000 | Olson |
| 6,067,571 A | 5/2000 | Igarashi et al. |
| 6,072,483 A | 6/2000 | Rosin et al. |
| 6,072,598 A | 6/2000 | Tso |
| 6,073,168 A | 6/2000 | Mighdoll et al. |
| 6,073,483 A | 6/2000 | Nitecki et al. |
| 6,081,623 A | 6/2000 | Bloomfield et al. |
| 6,084,584 A | 7/2000 | Nahi et al. |
| 6,087,952 A | 7/2000 | Prabhakaran |
| 6,088,220 A | 7/2000 | Katz |
| 6,092,107 A | 7/2000 | Eleftheriadis et al. |
| 6,097,352 A | 8/2000 | Zavracky et al. |
| 6,101,180 A | 8/2000 | Donahue et al. |
| 6,104,392 A | 8/2000 | Shaw et al. |
| 6,105,021 A | 8/2000 | Berstis |
| 6,108,655 A | 8/2000 | Schleimer et al. |
| 6,108,727 A | 8/2000 | Boals et al. |
| 6,118,449 A | 9/2000 | Rosen et al. |
| 6,118,899 A | 9/2000 | Bloomfield et al. |
| 6,119,135 A | 9/2000 | Helfman |
| 6,121,970 A | 9/2000 | Guedalia |
| 6,125,209 A | 9/2000 | Dorricott |
| 6,138,156 A | 10/2000 | Fletcher et al. |
| 6,157,935 A | 12/2000 | Tran et al. |
| 6,182,054 B1 | 1/2001 | Dickinson et al. |
| 6,182,127 B1 | 1/2001 | Cronin, III et al. |
| 6,185,625 B1 | 2/2001 | Tso et al. |
| 6,192,393 B1 | 2/2001 | Tarantino et al. |
| 6,195,667 B1 | 2/2001 | Duga et al. |
| 6,201,611 B1 | 3/2001 | Carter et al. |
| 6,219,465 B1 | 4/2001 | Nacman et al. |
| 6,226,400 B1 | 5/2001 | Doll |
| 6,233,541 B1 | 5/2001 | Butts et al. |
| 6,243,761 B1 | 6/2001 | Mogul et al. |
| 6,256,017 B1 | 7/2001 | Bullister |
| 6,256,750 B1 | 7/2001 | Takeda |
| 6,262,732 B1 | 7/2001 | Coleman et al. |
| 6,263,347 B1 | 7/2001 | Kobayashi et al. |
| 6,269,481 B1 | 7/2001 | Perlman et al. |
| 6,272,332 B1 | 8/2001 | Matsumoto et al. |
| 6,282,294 B1 | 8/2001 | Deo et al. |
| 6,285,461 B1 | 9/2001 | Fujii et al. |
| 6,286,003 B1 | 9/2001 | Muta |
| 6,295,059 B1 | 9/2001 | Lentz et al. |
| 6,297,945 B1 | 10/2001 | Yamamoto |
| 6,298,162 B1 | 10/2001 | Sutha et al. |
| 6,300,959 B1 | 10/2001 | Gabler |
| 6,304,928 B1 | 10/2001 | Mairs et al. |
| 6,311,058 B1 | 10/2001 | Wecker et al. |
| 6,313,880 B1 | 11/2001 | Smyers et al. |
| 6,317,781 B1 | 11/2001 | De Boor et al. |
| 6,345,279 B1 | 2/2002 | Li et al. |
| 6,356,283 B1 | 3/2002 | Guedalia |
| 6,359,603 B1 | 3/2002 | Zwern |
| 6,404,416 B1 | 6/2002 | Kahn et al. |
| 6,411,275 B1 | 6/2002 | Hedberg |
| 6,418,310 B1 | 7/2002 | Dent |
| 6,421,716 B1 | 7/2002 | Eldridge et al. |
| 6,424,369 B1 | 7/2002 | Adair |
| 6,433,801 B1 | 8/2002 | Moon et al. |
| 6,449,639 B1 | 9/2002 | Blumberg |
| 6,466,198 B1 | 10/2002 | Feinstein |
| 6,466,203 B2 | 10/2002 | Van Ee |
| 6,473,097 B1 | 10/2002 | Elliott |
| 6,477,143 B1 | 11/2002 | Ginossar |
| 6,480,710 B1 | 11/2002 | Laybourn et al. |
| 6,487,597 B1 | 11/2002 | Horie et al. |
| 6,535,743 B1 | 3/2003 | Kennedy, III et al. |
| 6,536,043 B1 | 3/2003 | Guedalia |
| 6,539,077 B1 | 3/2003 | Ranalli et al. |
| 6,544,295 B1 | 4/2003 | Bodnar |
| 6,553,240 B1 | 4/2003 | Dervarics |
| 6,553,412 B1 | 4/2003 | Kloba et al. |
| 6,560,621 B2 | 5/2003 | Barile |
| 6,564,250 B1 | 5/2003 | Nguyen |
| 6,565,611 B1 | 5/2003 | Wilcox et al. |
| 6,571,245 B2 | 5/2003 | Huang et al. |
| 6,574,501 B2 | 6/2003 | Lambert et al. |
| 6,587,583 B1 | 7/2003 | Kurzweil et al. |
| 6,598,087 B1 | 7/2003 | Dixon, III et al. |
| 6,603,469 B1 | 8/2003 | Gettemy et al. |
| 6,604,106 B1 | 8/2003 | Bodin et al. |
| 6,615,234 B1 | 9/2003 | Adamske et al. |
| 6,628,243 B1 | 9/2003 | Lyons et al. |
| 6,631,247 B1 | 10/2003 | Motoyama et al. |
| 6,633,314 B1 | 10/2003 | Tuli |
| 6,646,759 B1 | 11/2003 | Koga |
| 6,654,814 B1 | 11/2003 | Britton et al. |
| 6,674,445 B1 | 1/2004 | Chithambaram et al. |

| | | | |
|---|---|---|---|
| 6,677,965 | B1 | 1/2004 | Ullmann et al. |
| 6,690,403 | B1 | 2/2004 | Tuli |
| 6,704,024 | B2 | 3/2004 | Robotham et al. |
| 6,720,979 | B1* | 4/2004 | Shrader .......................... 715/723 |
| 7,113,638 | B2 | 9/2006 | Caruso et al. |
| 2001/0028470 | A1* | 10/2001 | Tuli ................................ 358/1.9 |
| 2001/0032254 | A1 | 10/2001 | Hawkins |
| 2001/0034770 | A1 | 10/2001 | O'Brien |
| 2001/0047441 | A1 | 11/2001 | Robertson |
| 2001/0052911 | A1 | 12/2001 | Boyle et al. |
| 2002/0015042 | A1 | 2/2002 | Robotham et al. |
| 2002/0018234 | A1 | 2/2002 | Fu et al. |
| 2002/0030843 | A1 | 3/2002 | Tuli |
| 2002/0030844 | A1 | 3/2002 | Tuli |
| 2002/0143627 | A1* | 10/2002 | Barsade et al. ................ 705/14 |
| 2003/0074672 | A1 | 4/2003 | Daniels |
| 2004/0010464 | A1* | 1/2004 | Boaz .............................. 705/40 |

FOREIGN PATENT DOCUMENTS

| | | |
|---|---|---|
| EP | 0 889 402 A2 | 1/1999 |
| EP | 0 889 636 A2 | 1/1999 |
| EP | 890922 A2 | 1/1999 |
| EP | 1 001 613 A1 | 5/2000 |
| EP | 1026578 A2 | 8/2000 |
| EP | 1043876 A2 | 10/2000 |
| EP | 1109113 A2 | 6/2001 |
| GB | 2347766 A | 9/2000 |
| WO | WO 97 30556 A2 | 8/1997 |
| WO | WO 97 38389 A2 | 10/1997 |
| WO | WO 98 40842 A1 | 9/1998 |
| WO | WO 98 43177 A1 | 10/1998 |
| WO | WO 99 09658 A2 | 2/1999 |
| WO | WO 99/48007 A1 | 9/1999 |
| WO | WO 00/18054 A2 | 3/2000 |
| WO | WO 0033232 A2 | 6/2000 |
| WO | WO 01 09836 A1 | 2/2001 |
| WO | WO 02/08878 A2 | 1/2002 |
| WO | WO 02/057951 A2 | 7/2002 |

OTHER PUBLICATIONS

International Search Report, PCT/CA 01/00114, 3 pages, 2001.
International Search Report, PCT/CA 01/00126, 3 pages, 2001.
International Search Report, PCT/CA 01/00170, 4 pages, 2002.
International Search Report, PCT/CA 01/00169, 3 pages, 2002.
Tagawa Norio, "Data Relay System and Data Repeater Applied to the System", Patent Abstracts of Japan, vol. 1997, No. 10, Jun. 24, 1997.
Armando Fox et al, "Experience with Top Gun Wingman: a proxy-based graphical web browser fro the 3Com PalmPilot", *Middleware*, IFIP International Conference on Distributed Systems, Platforms and Open Distributed Processing, Sep. 1998, pp. 407-424.
Richard Han, et al., "Dynamic Adaptation in an Image Transcoding Proxy for Mobile Web Browsing", *IEEE Personal Communication*, Dec. 1998, pp. 8-17.
Timothy Bickmore, et al., "Web Page Filtering and Re-Authoring for Mobile Users", *The Computer Journal*, vol. 42, No. 6, 1999.
Tristan Richardson, Quentin Stafford-Fraser, Kenneth R. Wood & Andy Hopper, "Virtual Network Computing", *IEEE Internet Computing*, vol. 2 No. 1, Jan./Feb. 1998 pp. 33-38.

Citrix Systems, Inc.: "Citrix Announces New Product and Product Enhancements that Speed Web Application", http://www.citrix.com/press/news/releases/20000905_product_enhance.asp, Sep. 5,2000.
Boutell, T. et al., "PNG (Portable Network Graphics) Specification Version 1.0", RFC 2083, pp. 1-102, Mar. 1997.
Halfhill, T.R., "Good-Bye GUI . . . .Hello, NUI," Byte Magazine, www.byte.com, vol. 22, No. 7, pp. 60-64, 66, 68, 70, and 72, Jul. 1997.
Masinter, L., "Returning Values from Forms: multipart/form-data," RFC 2388, pp. 1-9, Aug. 1998.
Jao, C.S. et al., "The display of photographic-quality images on the Web: a comparison of two technologies," IEEE Transactions on Information Technology In Biomediciene, vol. 3, iss. 1, pp. 70-73, Mar. 1999.
Kaljuvee, O. et al., "Efficient Web form entry on PDAs," ACM Proceedings of the tenth International Conference on WWW, ACM Press, ISBN: 1-58113-348-0, pp. 663-672, May 2001.
Selected pages from At&T Wireless, Bell Atlantic Mobile, and Nextel, as delivered through the Wayback Machine, web.archieve.org , 2000.
Lewis, Ted. "Information Appliances: Gadget Netopia" *Computer*, vol. 31, issue 1, Jan. 1998, pp. 59-68.
Cimini, Leonard J., Jr., et al. "Advanced Cellular Internet Service (ACIS)", *IEEE communication Magazine*, vol. 36, Issue 10, Oct. 1998, pp. 150-159.
Oliphant, Malcolm W. "The Mobile Phone Meets the Internet", *IEEE Spectrum*, vol. 36, Issue 8, Aug. 1999, pp. 20-28.
Lind, R., et al. "The Network Vehicle—A Glimpse into the Future of Mobile Multi-Media", *IEEE ASE Systems Magazine*, Sep. 1999, pp. 27-32.
Gbaguidi, Constant, et al. "A programmable Architecture for the Provision of Hybrid Services", *IEEE communications Magazine*, vol. 27, Issue 7, Jul. 1999, pp. 110-116.
Narayanaswamy, Shankar, et al. "User Interface for a PCS Smart Phone", *IEEE Int.. Conference on Multimedia Computing and Systems*, vol. 1 Jun. 1999, pp. 777-781.
Rumba Technical Bulletin, "Configuring RUMBA LPR & LPD (16-bit)," 1996, from the web: 156.27.8.200/ts_rumba/solution/pdf/TCPIP/4002.pdf, pp. 1-11.
International Search Report, PCT/CA 02/00133, 3 pages, 2003.
International Search Report, PCT/CA 02/00048, 3 pages, 2003.
International Search Report, PCT/CA 01/01057, 2 pages, 2003.
Joel F. Bartlett, "Experience with a Wireless World Wide Web Client", Mar. 1995.
International Search Report, PCT/CA 03/01840, 3 pages, 2004.
International Search Report, PCT/CA 03/01326, 3 pages, 2004.
Bjork et al., "West" A Web Browser for Small Terminals, 1999, ACM, pp. 187-196.
Buyukkokten, et al. "Power Browser: Efficient Web Browsing for PDAs", ACM, 2000, pp. 430-437.
Spyglass Concepts and Applications: Spyglass Prism, 1997, Spyglass Inc. pp. 1-8.

* cited by examiner block 1 block 1a                    block 1b

First drawing sequence

Second drawing sequence

PORTABLE INTERNET ACCESS DEVICE BACK PAGE CACHE

BACKGROUND OF THE INVENTION

The invention relates to a host computer system or server, which has a web browser running on it, and the display of the web browser is transmitted and received by a cellular phone connected wired or wirelessly to a PDA device, which displays the image. In particular, the invention consists of multiple virtual machines which are contained in the server, and each contains a browser, which has applications running in them. Multiple clients are represented by software, which sends the display of each virtual machine to the remote PDA device to be displayed, and also relays information back to the virtual machine from the PDA device. The invention relates to methods of reducing the amount of data transferred between the server and PDA to conserve on costs associated with cellular phone usage. The invention also relates to methods of storage and retrieval of previously viewed web pages.

SUMMARY OF THE INVENTION

The present invention relates to multiple portable high speed Internet access PDA (Personal Digital Assistant) devices that can access the Internet and World Wide Web as wireless devices, using a client and server system to facilitate multiple PDA users simultaneously on a single server.

A Web server connected to the Internet contains a virtual browser that takes the image displayed in the browser, and converts this image into a bit map which is compressed, and communicates via telephone lines to a cellular telephone. The cellular telephone is connected to a high speed Internet access device commonly referred to as a PDA (Personal Digital Assistant) which is comprised of a display screen, battery and related micro-electronics. This enables the PDA to receive, decompress and view the bit map image sent from the virtual browser, and more importantly, through cellular phone connectivity to be able to input data or commands from the PDA directly onto the server. The host computer or server receives vector information or compressed data in the form of HTML, JPEG, etc., which is displayed on a web page. The virtual browser virtually displays a virtual image on the server. That image, in whole or in parts, is recompressed and sent to the PDA. In particular, the host computer contains an RDP (Remote Data Protocol) server, which has multiple virtual machines contained within, with each virtual machine containing a web browser. Multiple RDP clients interact with the virtual machines with a dedicated virtual machine for each client on the server. Each client is represented by software, which sends the display of the virtual machine to a single remote PDA device via a dedicated modem port. This modem port allows two-way communication between a single PDA and a dedicated virtual machine on the server, via a single RDP client. By implementing multiple virtual machines and multiple RDP clients with multiple modem ports, it is now possible to communicate with multiple users of PDA devices on the RDP server to facilitate Internet browsing, electronic message communication, etc. The RDP client relays information received via a modem port from the PDA, such as mouse clicks or keyboard commands, to the application program in the virtual machine, which is then processed and a refreshed display sent back to the PDA via the same dedicated RDP client and modem port. The browser on a virtual machine relays display information to the dedicated RDP client such as bitmap files, vector files, commands, buffer information, etc. The RDP client then rasterizes some of the information by drawing it into memory and then proceeds to break up this file into smaller blocks of information. These blocks are compressed and sent to the PDA device through a dedicated modem port connected to each RDP client. The PDA would then receive, decompress and assemble the blocks of information in the original order as first received by the RDP client before the RDP client breaks up into smaller blocks. The browser running in each virtual machine rasterizes most of the information which is sent to the RDP client such as text, etc., but the RDP client may have to rasterize other information such as blocks, etc.

The PDA sends specific data to the virtual machine informing of the current location of the displayable area of the PDA screen with respect to the larger image sent from the browser. This is necessary, as the area displayed by the PDA is smaller than the displayable image on the browser window. The RDP client would send compressed blocks of data representing the image to be displayed in order of priority, such that the first blocks sent to and decompressed by the PDA are in the displayable area of the PDA, which is the current area where the user is viewing. The PDA would then decompress blocks surrounding the displayed area in a particular sequence, such as left to right across rows, and store the image in internal memory. The PDA assembles blocks of the image in a virtual page, which comprises the entire image, thus enabling the user to access any part of the present image without communicating constantly with the RDP client. Hence, as the user scrolls across the image in any direction, the blocks of data comprising the image would already be decompressed and assembled priority-wise for instant viewing. Blocks of the image in closer proximity to the displayed area of the PDA screen get decompressed and stored into internal memory on higher priority than blocks further away. The PDA continuously sends its current location to the virtual machine on the server to keep getting refreshed data instantaneously as the location changes by the user scrolling or sending commands. This enables a rapid refresh rate of the displayed image especially when scrolling, as areas surrounding the displayed image would be decompressed and already stored in memory.

A mouse click or any keyboard command is given priority in communication between the PDA and the RDP server. Such actions from the PDA are sent instantaneously, interrupting the current activities and this action directed to the web browser on the dedicated virtual machine, which sends a refreshed image back to the PDA device. This feature allows the user to have rapid response to commands. If the user initiates a mouse click or keyboard command on the PDA that does not change the displayed image on the RDP server, then the original activities are continued almost instantly with minimum interruption. However, if the image is changed and refreshed on the RDP server, any old image being sent is stopped and the new image is sent immediately to the PDA if it is a full screen image occupying all or part of the PDA display screen. If the refreshed image sent occupies a part of the PDA display screen and also areas outside the display screen, then the portion of the refreshed image that is displayed on the PDA display screen is sent first to the PDA, and blocks of the image are sent to the PDA which are decompressed and stored in internal memory, in order of priority closest to the displayed image, as previously described. Hence the PDA would assemble blocks of the image in the virtual page, which comprises the entire image, starting first with the current location of the PDA display screen then areas around it.

A beacon is sent form the PDA device to the RDP client and vice-versa many times per minute to confirm that a connection is established and maintained, for the duration of use. In the instance a user is disconnected, either the PDA or the RDP client will not receive a beacon and a time-out will be initiated, whereby both the PDA and RDP client disconnect and then reconnect. The user would still be able to view the present image and scroll around it as this image would already be decompressed in order of priority and stored in internal memory. The PDA would indicate in a message area that a reconnect sequence was initiated, and the status of this connection to the same RDP client as before, which would refresh the PDA with the image if it has changed once reconnection is established. Similarly, the PDA would continue downloading blocks of information after being reconnected if a disconnection interrupted this operation. A beacon is not necessarily sent from the RDP client at times when it is sending information to the PDA. As long as the PDA is receiving information such as a refreshed image, or a beacon, it knows a connection is established. Consequently, when there is no new activity in the virtual machine, the RDP client must send a beacon to the PDA to confirm the connection is established. The PDA device must always send beacons to the RDP client, as commands are not sent frequently from the PDA and only for a short duration when sent.

An error protocol is implemented to verify that all information blocks are received and can be decompressed successfully. As previously described, the image displayed in the virtual browser in the virtual machine on the RDP server is broken down into smaller blocks of information and compressed and transmitted to the PDA device. The blocks are then assembled in correct sequence, decompressed and stored in internal memory on the PDA. Each block of information received is acknowledged by the PDA, which sends a signal confirming that each block is successfully received. Hence, the RDP client can monitor the successful decompression of all blocks of information sent to the PDA, and would know when a block is not acknowledged. The RDP client would also inform the PDA of the number of transmitted blocks of information, with each block identified numerically. The PDA also initiates another error protocol when a block of information received cannot be successfully decompressed and stored in memory. In this case, the PDA would send an error message to the RDP client informing which block of information needs to be sent again, and the RDP client would send this block after it has completed sending the current block of information. The RDP client would monitor the acknowledgement of all blocks of information successfully decompressed, including blocks sent again after receiving error messages from the PDA device.

The portion of the web page image on the browser that is sent to the PDA may be a little larger than the PDA screen to facilitate a little scrolling, without having to send the full web page image. This reduces the amount of data sent to the cell phone and PDA, thereby reducing the operating cost of these devices. The amount of memory storage on the PDA is also reduced.

Animation or moving parts of the web page image on the browser are captured in a single snap shot or frozen image and sent to the PDA to be displayed. Even though further animation changes are occurring on the browser, these are not sent to the PDA unless the user clicks or types text on the display. The web page must be fully received and rendered first by the browser at the server before the frozen image is sent to the PDA. If the user clicks or types text on the PDA display then the single frozen frame unfreezes at the browser, enabling the user to see text entered, or drop down menus, etc.

Back pages or previously viewed web page images are stored in cache memory on the PDA, and since the server sends these images, it also mirrors what is in the PDA's cache in the server's memory. Thus, the server has information on the exact location of each back page or previously viewed web page images, and also the blocks of information comprising each image. Some web page images stored in the PDA's cache may only have data occupying a portion of the web page.

The server may only send the PDA new information on a previously viewed web page or back page only if there are changes made to these pages, thus the amount of data sent to the PDA or cellular phone may be substantially reduced. The server performs a correlation analysis after the user chooses to go to a web page image previously viewed and still stored in the PDA's cache memory. Thus, the server determines which parts or blocks of the web page image have changed and need to be sent to the PDA to be replaced in cache memory.

Various algorithms may be used for the server to determine what information is to be removed from the PDA's cache memory as it approaches its full capacity. A first in first out method may be adopted. The server may also keep track of the most visited web pages and keep the most visited web page the longest in cache as a criteria for storage priority. The server may also apply a weight factor to how frequently each web page is visited by the user and also when each web page was last visited. A priority of saving web pages in the PDA's cache may be established based on parts of the web pages most frequently visited by the user. Thus, parts of the web pages stored in cache are removed if not viewed often or if it has been a long time since they have been visited.

A certain amount of data may be allocated per user over a set period, and if the user is consuming too much data, methods may be implemented to reduce the amount of data sent to the PDA. The time it takes for the PDA to receive web pages may be increased, so that it takes longer for data to reach the PDA. The bandwidth may also be reduced to throttle or slow down the rate of data transmission to the PDA.

BRIEF DESCRIPTION OF THE DRAWINGS

The invention is described in more detail below with respect to an illustrative embodiment shown in the accompanying drawings in which.

DETAILED DESCRIPTION OF THE PREFERRED EMBODIMENTS

To facilitate description, any numeral identifying an element in one figure will represent the same element in any other figure.

Figure 4:
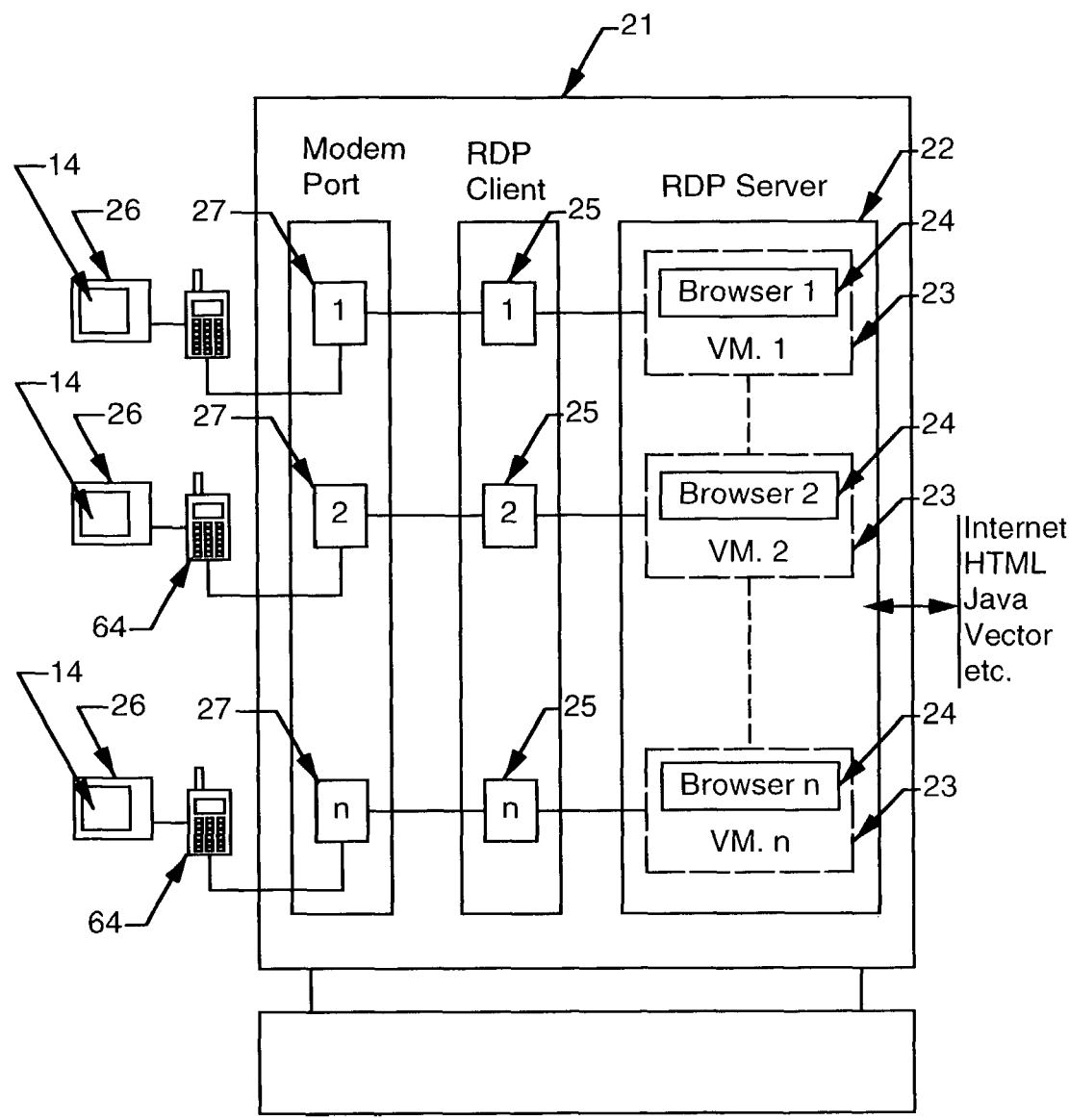
FIG. 4 illustrates the Remote Data Protocol in accordance with Prior Art.

The principal embodiment of the invention aims to provide a system that allows multiple users operating PDA (Personal Digital Assistant) devices similar to a palm top computer to access the Internet or the World Wide Web (WWW), as demonstrated in FIG. 4, as previously disclosed. Prior Art relied upon provides a RDP (Remote Data Protocol) client and server system to facilitate multiple PDA users simultaneously on a single server.

Figure 1:
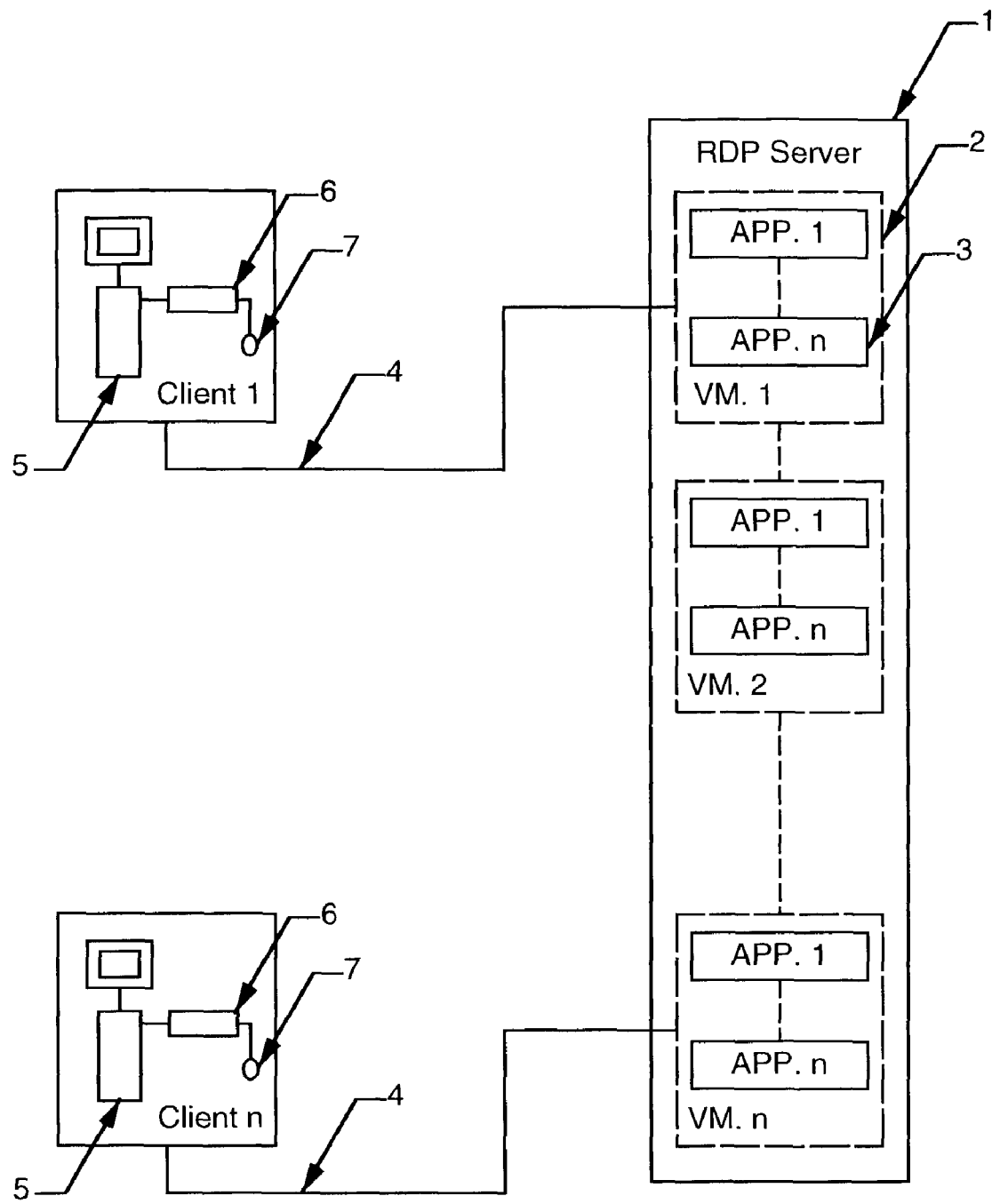
FIG. 1 illustrates Prior Art whereby a PDA device is connected to a cellular phone, which communicates wirelessly to a Host Computer.

Prior Art is disclosed in FIG. 1 where Microsoft Remote Data Protocol is demonstrated, using a main RDP server 1 in which virtual machines 2 exist capable of running multiple application programs 3. Each virtual machine 2 is connected to a dedicated terminal 5 or client on a network system 4, which displays the image of the virtual machine. The terminals 5 on the network allow input of keyboard 6 and mouse 7 commands to the RDP server 1, with all data processing done on the server and displayed on the terminals. In this method of Prior Art, the RDP clients are the terminals on the network. In the present invention however, the RDP clients are represented by software which interact between the virtual machines on the RDP server and the PDA devices which display the image of the RDP clients, in a completely different fashion.

Figure 2:
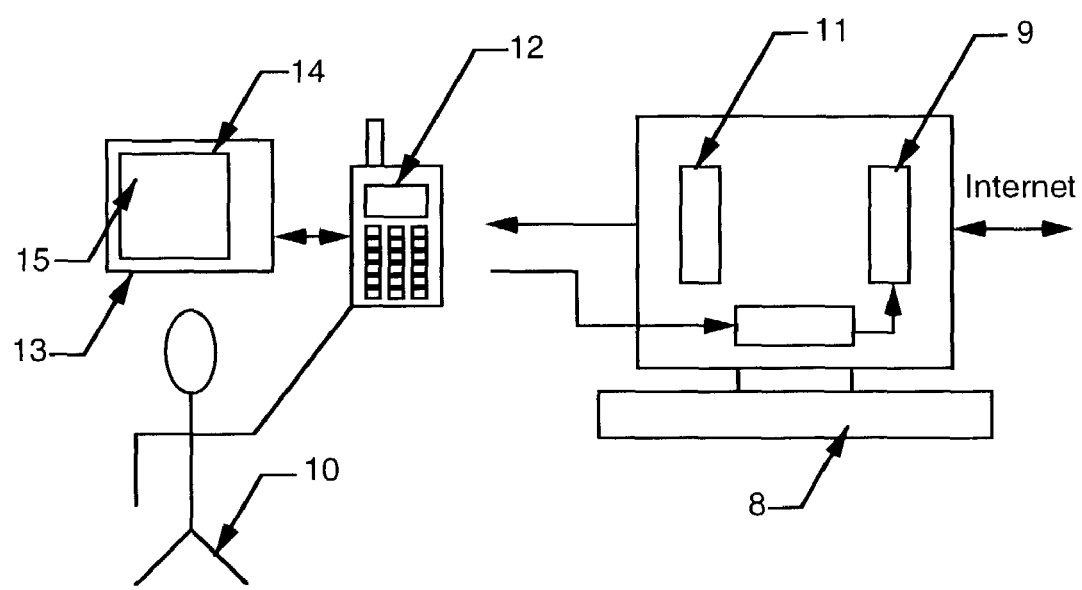
FIG. 2 illustrates Prior Art of a Remote Data Protocol system.

A general description of the Prior Art is disclosed in FIG. 2 with further reference to Prior patent application Ser. Nos. 09/496,172, 09/501,585, 09/504,809, 09/504,808, 09/504,807, 09/677,857, 09/650,412, and 09/677,857, at least some of which are discussed further herein. A host computer 8 is depicted which is connected to the Internet, and that host may also be a Web server. Running in the host computer, is a Web server program 9. When a remote user 10 requests to view a Web page (or electronic message etc.) the Web server software receives HTML, JAVA, or other types of information and transmits this information to another software, the Browser Translator 11. This software translates the information, (i.e. the entire image comprising graphics and text) received in the form of HTML, Java, etc. (as information may be gathered from different sources) and translates it to a black and white bit map or raster image. In another embodiment, the software translates the information into a raster or color image. The image contains the information that would normally be displayed on a single Web page. The translation program therefore acts as a virtual browser. The cellular telephone 12 of FIG. 2 is connected to the high speed internet access device 13 of the invention commonly referred to as a PDA (Personal Digital Assistant) which is comprised of a display screen 14, battery and related micro-electronics. This enables the PDA to receive, decompress and view the bit map image sent from the virtual browser, and more importantly, through cellular phone connectivity to be able to input data from the PDA directly onto the server 8. In particular, the host computer or server of FIG. 2 and FIG. 4 receives vector information or compressed data in the form of HTML, JPEG, etc., which is displayed on a web page. The virtual browser virtually displays a virtual image on the server by rasterizing the image, or decompressing parts of the image and putting it into memory. That image, in whole or parts, is recompressed and sent to the PDA. The recompressed data format sent to the PDA, is not necessarily in the same format as the compressed data format first received by the server. For example, the incoming data from a Web page may be in the form of JPEG which is decompressed and displayed on the virtual browser. This data is recompressed and sent to the PDA but can be in the form of TIFF G4 or other formats, and not necessarily JPEG as initially received.

Another embodiment of the invention involves the server receiving vector information such as HTML or text and then rasterizing it to bit map format. It can then be shown in memory through the virtual browser and is recompressed through a "loss less" method and sent to the PDA.

Figure 3:
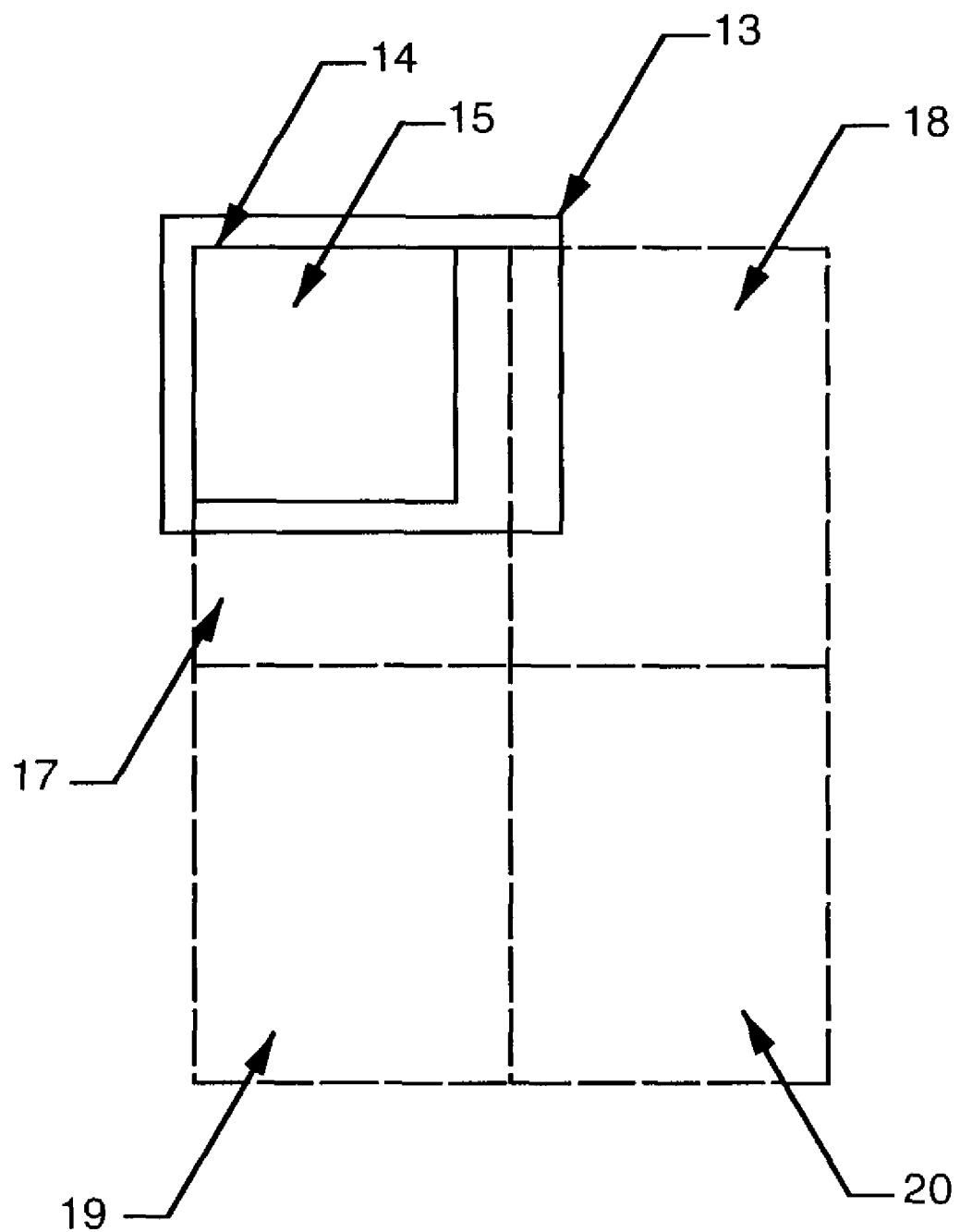
FIG. 3 illustrates the displayable area of the PDA device with respect to portions of the image, which are sequentially decompressed prior to viewing in accordance with Prior Art.

The information is received by the device 13 in FIG. 2, which has the ability to display a monochrome or color image 15, in its display window 14. The information is decompressed and displayed in the order of priority such that part of the image 17 of FIG. 3, which substantially or completely covers the displayable area 14 of the device, is decompressed and displayed first and then sequentially the portions 18, 19 and 20 of the image are decompressed, and stored in an internal memory of the device to be displayed later when the user scrolls up, down, or sideways to these parts of the image.

Prior application Ser. No. 09/677,857 demonstrates FIG. 4 to contain the host computer 21 which contains an RDP server 22 which is a software unit having multiple machines 23 contained within, with each virtual machine containing a web browser 24. Multiple RDP clients 25 interact with the virtual machines with a dedicated virtual machine for each RDP client. Each RDP client 25 is represented by software, which sends the display of each virtual machine 23 to a single remote PDA device 26 via a electronic modem port 27. Each modem port 27 allows a two-way communication between a single PDA 26, connected to a cellular telephone 64, and a dedicated virtual machine 23 on the RDP server, via a single dedicated RDP client 25. By implementing multiple virtual machines with multiple RDP clients with multiple modem ports, it is now possible to communicate with multiple users of PDA devices on the RDP server to facilitate Internet browsing, electronic message communication, etc. The RDP client 25 relays information received from the PDA 26, such as mouse clicks or keyboard commands, via a modem port 27 to the browser 24 in the virtual machine 23, which is then processed and a refreshed display is sent back to the PDA via the same dedicated RDP client and modem port. The browser on each virtual machine relays display information to the dedicated RDP client such as bitmap files, vector files, commands, buffer information, etc. The RDP client then rasterizes some of the information by drawing it into memory and then proceeds to break up this file into smaller blocks of information. These blocks are compressed and sent to the PDA device through a dedicated modem port connected to each RDP client, as further illustrated in FIG. 5. The PDA would then receive, decompress, and assemble the blocks of information in the original order as first received by the RDP client before the RDP client breaks up into smaller blocks. The browser running in each virtual machine rasterizes most of the information which is sent to the RDP client such as text, etc., but the RDP client may have to rasterize other information such as blocks, etc.

Figure 5:
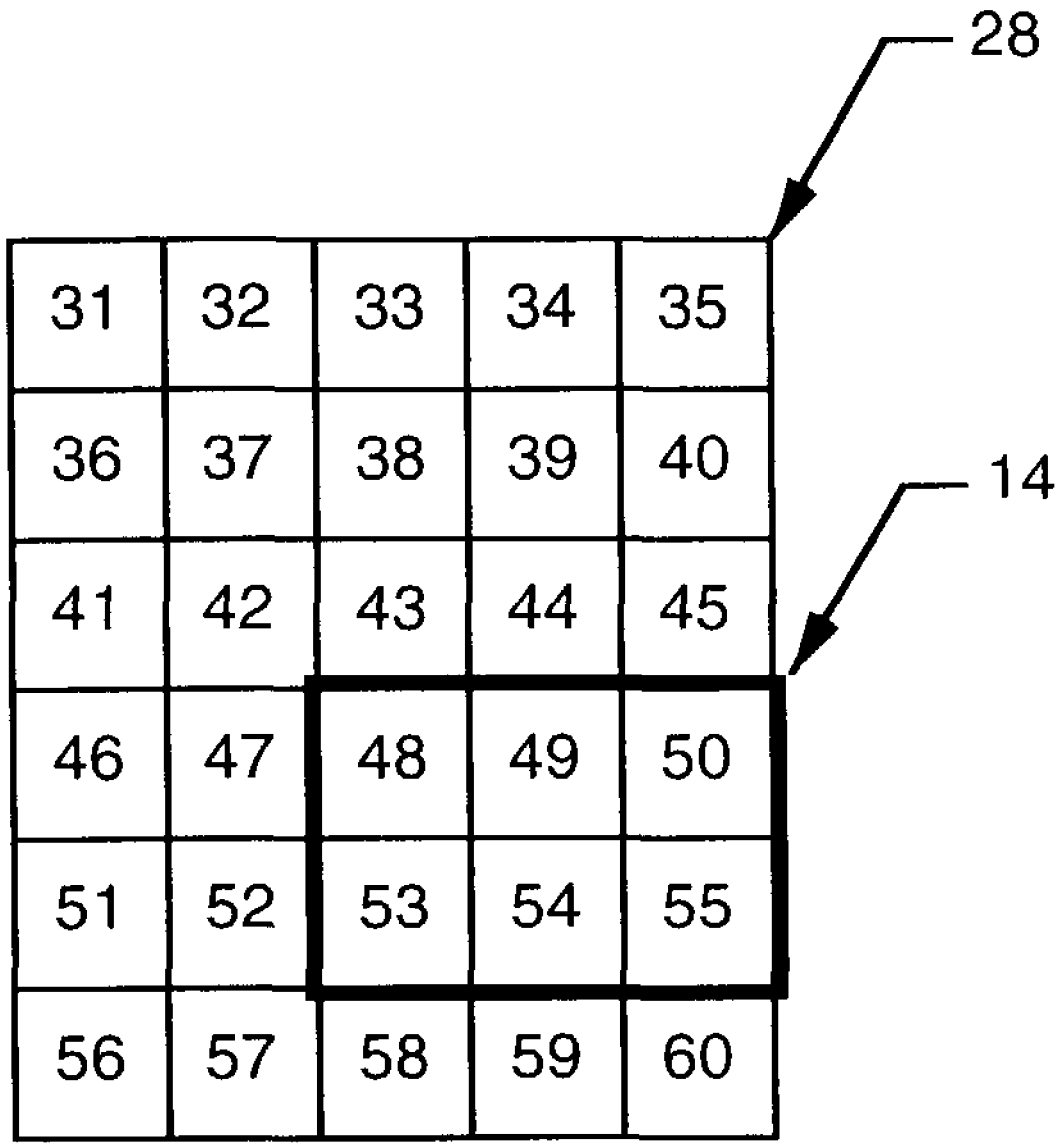
FIG. 5 illustrates a block diagram of the virtual page with respect to the viewing area of the PDA in accordance with Prior Art.

The PDA 26 of FIG. 4, in accordance with Prior Applications mentioned, sends specific data to the virtual machine 23 informing of the current location of the displayable area 14 of the PDA screen with respect to the larger image or virtual page 28 sent from the browser to the RDP client then to the PDA, as illustrated in FIG. 5. This is necessary, as the area displayed 14 by the PDA is smaller than the displayable image on the RDP client, referred to as the virtual page 28. The dedicated RDP client would send compressed blocks of data representing the image to be displayed in order of priority, such that the first blocks sent to and decompressed by the PDA are in the displayable area 14 of the PDA, which is the current area where the user is viewing. The PDA would then decompress blocks surrounding the displayed area 14 in a particular sequence, such as left to right across rows, and store the image in internal memory. The PDA assembles blocks of the image in a virtual page 28 stored in the PDA's internal memory, which comprises the entire image, thus enabling the user to access any part of the present image without communicating constantly with the RDP client. Hence, as the user scrolls across the image in any direction, the blocks of data comprising the image would already be decompressed and assembled priority-wise for instant viewing. Blocks of the image in closer proximity to the displayed area of the PDA screen get decompressed and stored into internal memory on higher priority than blocks further away. To explain in detail by referring further to FIG. 5, the image displayed on the PDA screen 14 can be comprised of blocks 48, 49, 50, 53, 54 & 55, which are sent from the RDP client first to the PDA, decompressed and then stored into memory first on the PDA. Then blocks 42, 43, 44, 45, 47, 52, 57, 58, 59 & 60 would be sent immediately after in that order from the RDP client to the PDA, to be decompressed and stored in the PDA's internal memory. This enables a rapid refresh rate of the displayed image especially when scrolling, as areas surrounding the displayed image would be decompressed and already stored in memory. The PDA continuously sends its current location to the RDP client to keep getting refreshed data instantaneously, should the location change by the user scrolling around or outside the virtual page 28, to enable the RDP client to always have the viewing area and surrounding blocks sent to the PDA.

A mouse click or any keyboard command on the PDA is given priority in communication between the PDA and the RDP server. Such actions from the PDA are sent instantaneously, interrupting the current activities and this action directed to the web browser on the dedicated virtual machine, which sends a refreshed image back to the PDA device through the RDP client. This feature allows the user to have rapid response to commands. If the user initiates a mouse click or keyboard command on the PDA that does not change the displayed image on the RDP server, then the original activities are continued almost instantly with minimum interruption. However, if the image is changed and refreshed on the RDP server, any old image being sent is stopped and the new image is sent immediately to the PDA if it is a full screen image occupying all or part of the PDA display screen. If the refreshed image sent occupies a part of the PDA display screen and also areas outside the display screen, then the portion of the refreshed image that is displayed on the PDA display screen is sent first to the PDA, and blocks of the image surrounding the PDA displayed image are sent next to the PDA which are decompressed and stored in internal memory, as previously described. Hence the PDA would assemble blocks of the image in the virtual page, which comprises the entire image, starting first with the current location of the PDA display screen then areas around it.

A beacon is sent from the PDA device to the RDP client and vice-versa many times per minute to confirm that a connection is established and maintained, for the duration of use as disclosed in Prior Applications. In the instance a user is disconnected, either the PDA or the RDP client will not receive a beacon and a time-out will be initiated, whereby both the PDA and RDP client disconnect and then reconnect. The user would still be able to view the present image and scroll around it as this image would already be decompressed in order of priority and stored in internal memory. The PDA would indicate in a message area that a reconnect sequence was initiated, and the status of this connection to the same RDP client as before, which would refresh the PDA with the image if it has changed once reconnection is established. Similarly, the PDA would continue downloading blocks of information after being reconnected if a disconnection interrupted this operation. A beacon is not necessarily sent from the RDP client at times when it is sending information to the PDA. As long as the PDA is receiving information such as a refreshed image, or a beacon, it knows a connection is established. Consequently, when there is no new activity in the virtual machine, the RDP client must send a beacon to the PDA to confirm the connection is established. The PDA device must always send beacons to the RDP client, as commands are not sent frequently from the PDA and only for a short duration when sent.

Figure 6:
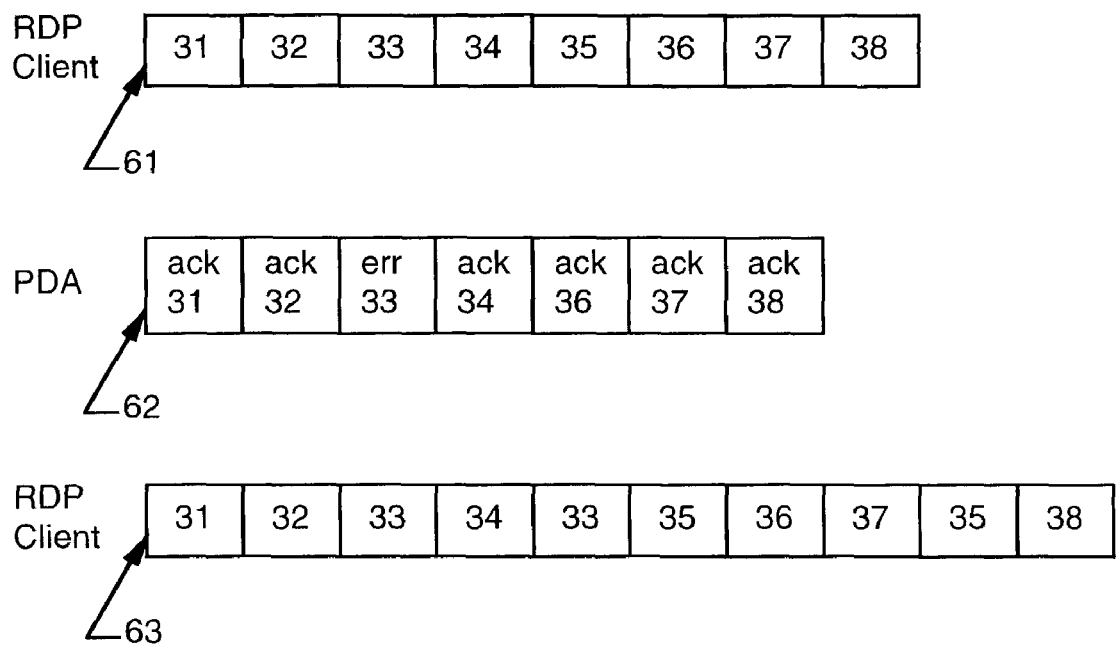
FIG. 6 illustrates the error protocol as blocks of information are sent from the RDP client to the PDA device in accordance with Prior Art.

An error protocol is implemented in accordance with Prior Applications, to verify that all information blocks are received and can be decompressed successfully. As previously described, the image displayed in the virtual browser in the virtual machine on the RDP server is broken down into smaller blocks of information and compressed and transmitted to the PDA device. The blocks are then assembled in correct sequence, decompressed and stored in internal memory on the PDA. Each block of information received is acknowledged by the PDA, which sends a signal confirming that each block is successfully received. Hence, the RDP client can monitor the successful decompression of all blocks of information sent to the PDA, and would know when a block is not acknowledged. The RDP client would also inform the PDA of the number of transmitted blocks of information, with each block identified numerically. The PDA also initiates another error protocol when a block of information received can not be successfully decompressed and stored in memory. In this case, the PDA would send an error message to the RDP client informing which block of information needs to be sent again, and the RDP client would send this block after it has completed sending the current block of information. The RDP client would monitor the acknowledgement of all blocks of information successfully decompressed, including blocks sent again after receiving error messages from the PDA device. To illustrate this further, reference is made to FIG. 6 which shows a string of data blocks 61 to be sent from the RDP client to the PDA device. As the PDA receives the data blocks acknowledgements or error messages 62 are sent back to the RDP client. Since the RDP client responds to all data from the PDA, the string of data blocks actually sent from the RDP client to the PDA is represented by 63. To further explain the events of the RDP client 63, blocks 31, 32, 33 & 34 are sent in this order from the RDP client to the PDA, with successful acknowledgements ack31 & ack32 sent from the PDA to the RDP client, but whilst block 34 is being sent, an error message in block 33 is relayed from the PDA, resulting in the RDP client sending this block 33 again as soon as block 34 is sent. The RDP client resumes sending blocks 35, 36 and 37, but notices no acknowledgement for block 35 after receiving successful acknowledgements ack34 & ack36 sent from the PDA, which results in the RDP client sending block 35 after block 37 is sent. The RDP client may also respond faster or slower to acknowledgements or error messages as described above.

Figure 7:
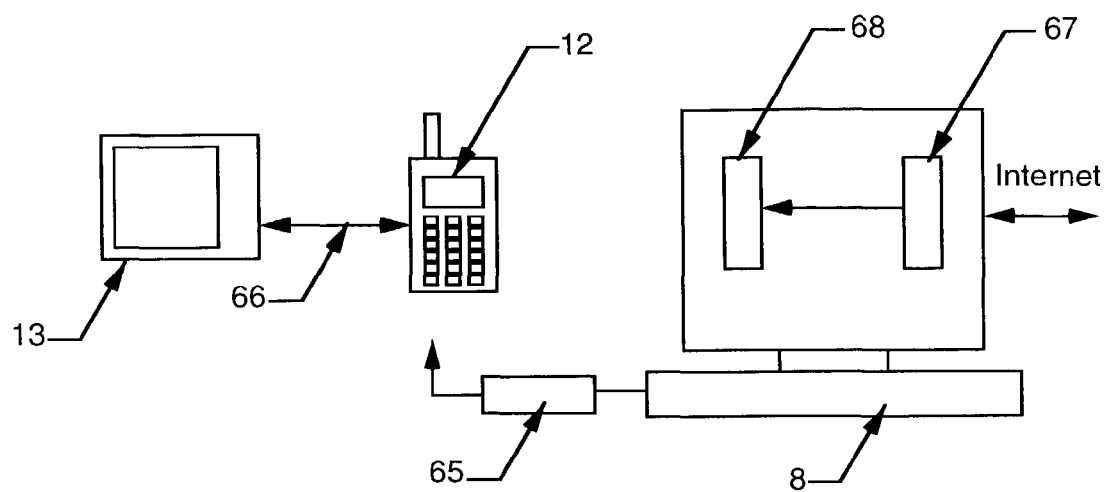
FIG. 7 illustrates communication methods between remote devices and host computers in accordance with Prior Art.

The illustration of FIG. 7 teaches of a standard serial connection 66 between the PDA device 13 and a cellular phone 12, with an AT command set for communicating between modems. This allows the cellular phone 12 to act as a modem in communicating with another modem 65 attached to the host computer 8. Web pages 67 received from the Internet are converted to G4 files 68 then sent via modem to the PDA device.

Figure 8:
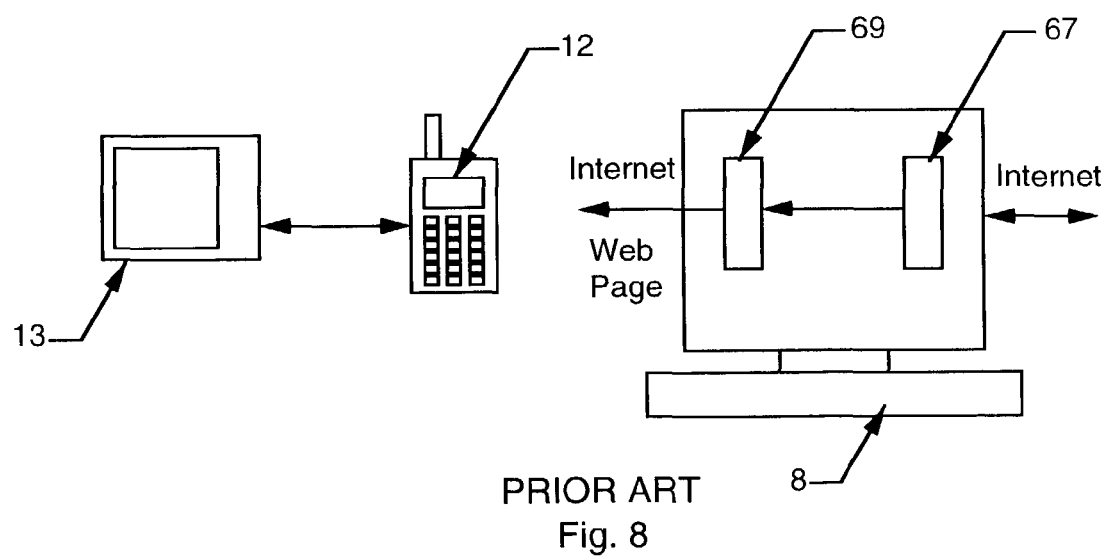
FIG. 8 illustrates a wireless communication method between the PDA and the Host Computer in accordance with Prior Art.

For a different type of cellular phone that does not allow AT command set communication but provides a TCPIP Internet connection, another embodiment is disclosed, as illustrated in FIG. 8. The PDA device would contain a browser to be able to view images sent by the host computer, which may be connected to the Internet. In this case, the PDA device 13 would contain a mini-browser, which understands and is capable of translating compressed G4 images. The PDA is connected to a cellular phone 12, which is connected to an Internet Service Provider (providing standard Internet services) instead of a modem at the Host Computer. The Host Computer is connected to the Internet and translates all web pages 67 to G4 compressed files 69. These G4 compressed files 69 are sent to the PDA in Internet protocol via the Internet Service Provider, and the mini-browser in the PDA is capable of translating the received images, and displaying on the PDA screen. Hence, the Host Computer has Internet images coming in and also Internet images being sent out. The Internet Service Provider (ISP) that the PDA connects to would always log on to one web page, and when the user at the PDA wants to go to a link or to a different web page, the click or the information is sent through the ISP to the host computer which will load the new page. This allows multiple users to dial up the Internet Service Provider to be able to view web pages from the Internet as desired, in this manner.

Prior application Ser. No. 09/650,412 discloses the image displayed in the virtual browser is compressed at the server in various amounts, by different methods before sending to the PDA device. A web page is usually comprised of text portions and picture portions. Different parts of the image are compressed in different ways. Parts of the image that are text images are compressed by G4 compression techniques. Other parts of the image containing pictures are compressed by JPEG compression techniques. The entire image is converted to a raster image but different parts are converted at different depths of color, and by different compression techniques. Text portions can be compressed by "loss less" techniques, which will result in complete image reproduction with no errors in text upon decompression, whereas pictures can be compressed by "lossy" techniques which upon decompression give a slightly degraded image quality for each compression. An image with black and white text and color picture portions would be converted to a raster image, but only the text part of it reduced to black and white 1 bit and other picture parts to 24 bit or other color bit depths. Hence different parts of the image can be converted or reduced to different depths of color to resemble an actual web page with picture in color and text in black and white. The depths of color can be set by the user or preset at the server depending on the quality of image required, which affects the speed of refreshing the screen which also depends on the amount of pictures displayed and the amount of bandwidth used. Text and pictures from a web page would get compressed separately at the server and then sent to the PDA. In the PDA, text or black and white portions of the image get decompressed first and displayed on the screen. Color portions get decompressed and are overlain in the image on the screen shortly after, enabling the user to view black and white portions of the image in advance. At the browser, the priority of decompression is determined by the depth of color, with the minimum depth being decompressed first.

A further embodiment would take the entire image to be viewed including all text and pictures and convert it to 1 bit raster. This file is compressed by G4 or other loss less compatible methods and sent to the PDA. When received by the PDA, this file or packets are decompressed for the user to view the image almost instantaneously. One of the ways this is accomplished is by taking a web page image at the server, comprising text and picture portions, and compress the text and picture portions at different depths of color and by different compression techniques, so that a black & white image is first displayed on the PDA screen after decompressing, and then the picture portions of the image are overlain with color. In particular, the text and picture portions are initially displayed at the PDA in 1-bit color, and the picture portions only are overlain on top of the initial 1-bit with 24-bit color. Thus, the text will be displayed in 1-bit color and pictures would be displayed in 24-bit color. This enables an image to be viewed quickly without the full color details, which follow moments after, by reducing the bandwidth of the information sent to the PDA to be first displayed.

In another embodiment, the text and picture portions are initially displayed at the PDA in 3-bit color and the picture portions are overlain on top of the initial 3-bit with 8-bit color. Thus, the text will be displayed in 3-bit color and pictures would be displayed in 8-bit color. This method provides a means to view the image rapidly while also conserving on bandwidth. The picture portions may also be overlain with 24-bit color keeping the text at 3-bit color, in a further embodiment.

In a further embodiment, which discloses another method of reducing the bandwidth consumed, consequently providing a fast display from the time an image is sent from the server to the PDA, the text and pictures may be sent in a low bit color and the picture portions overlain with higher bit depths of color as previously described, but the picture resolution is reduced before sending from the server to the PDA. Therefore, by example a picture, which is 100 pixels×100 pixels, is reduced in resolution by four times and then sent from the server to the PDA. This would reduce the amount of data transferred from the server to the PDA, conserving on bandwidth consumed providing an image, which is "blocky" at first being of a low resolution, but more pixels are sent moments afterwards thereby improving the picture resolution.

Figure 9:
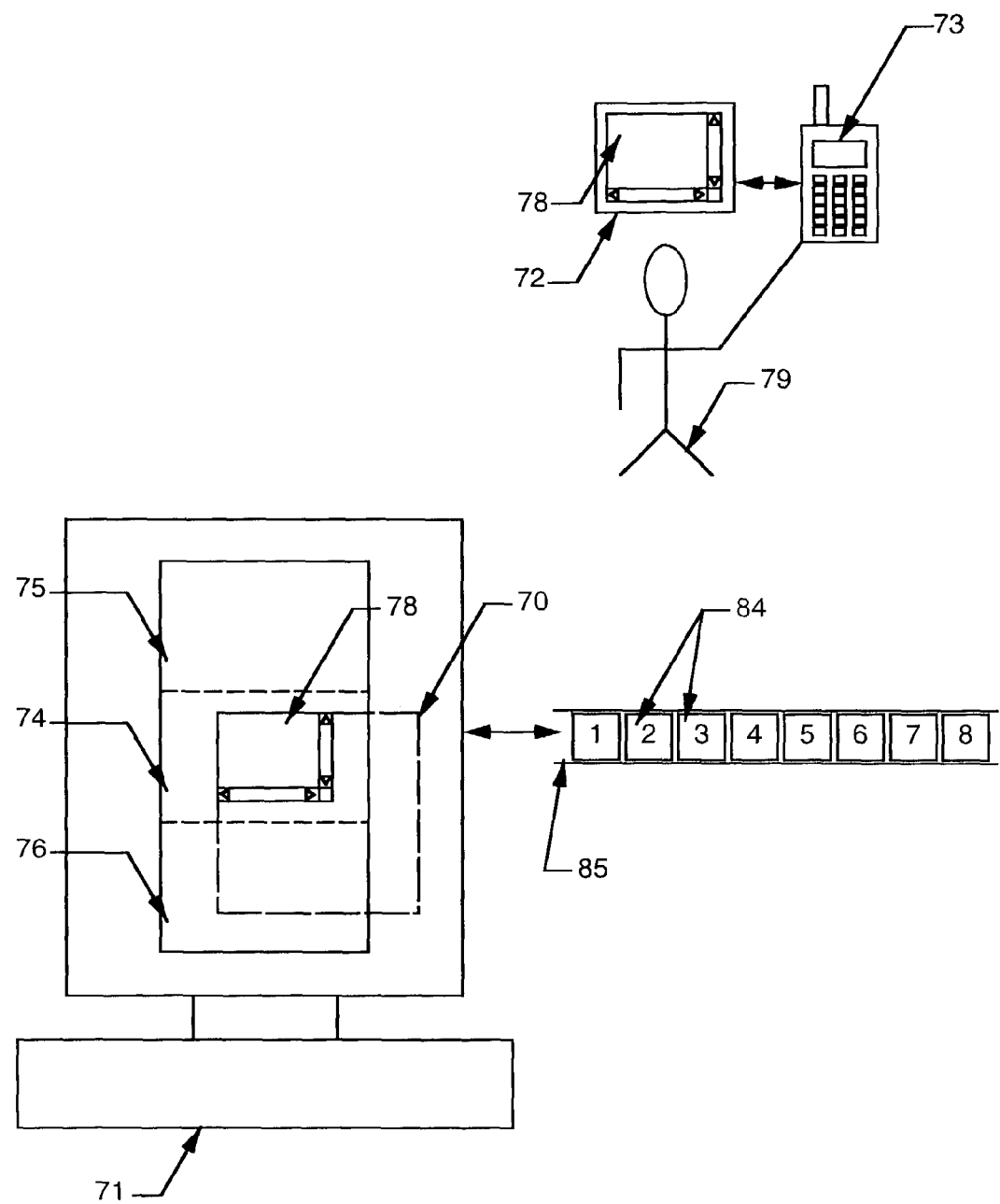
FIG. 9 illustrates the transfer of packets of data from a web page on the server to the PDA, in accordance with Prior Art.

In accordance with the invention, as illustrated in FIG. 9, the server 71 contains many browsers 74, 75, and 76, in which each browser is running its own web page, and each browser is meant for a different PDA. A particular web page 70 that is displayed first on one browser 74 at the server 71, is transmitted to the PDA device 72 which is connected to a cellular telephone 73. The displayable area or screen 78 of the PDA is shown to be much smaller than the entire web page 70, thus it is important to establish a priority in sending data of the web page to the PDA, as the user will want to first view the location that the PDA screen occupies on the web page. Data of each web page is broken down into many packets or blocks, whereby these packets or blocks are transmitted from the server to the PDA and assembled into memory in the PDA, and then displayed on the screen. In an alternate embodiment, the blocks transmitted from the server to the PDA may be assembled first on the screen and then stored into memory. In a further embodiment, the blocks transmitted from the server to the PDA may be simultaneously assembled on the screen and stored into memory. A packet of data may contain one or more blocks or a packet may only consist of part of a block. For demonstration purposes, a packet is defined as an entire block, which is transmitted from the server to the PDA. When a new web page is displayed on the PDA screen, the user 79 will want to first see the segment of that web page occupied by the screen area 78. Thus, all blocks of data that fill up the screen area of the current web page on display must be transmitted to the PDA as a first priority.

Figure 10:
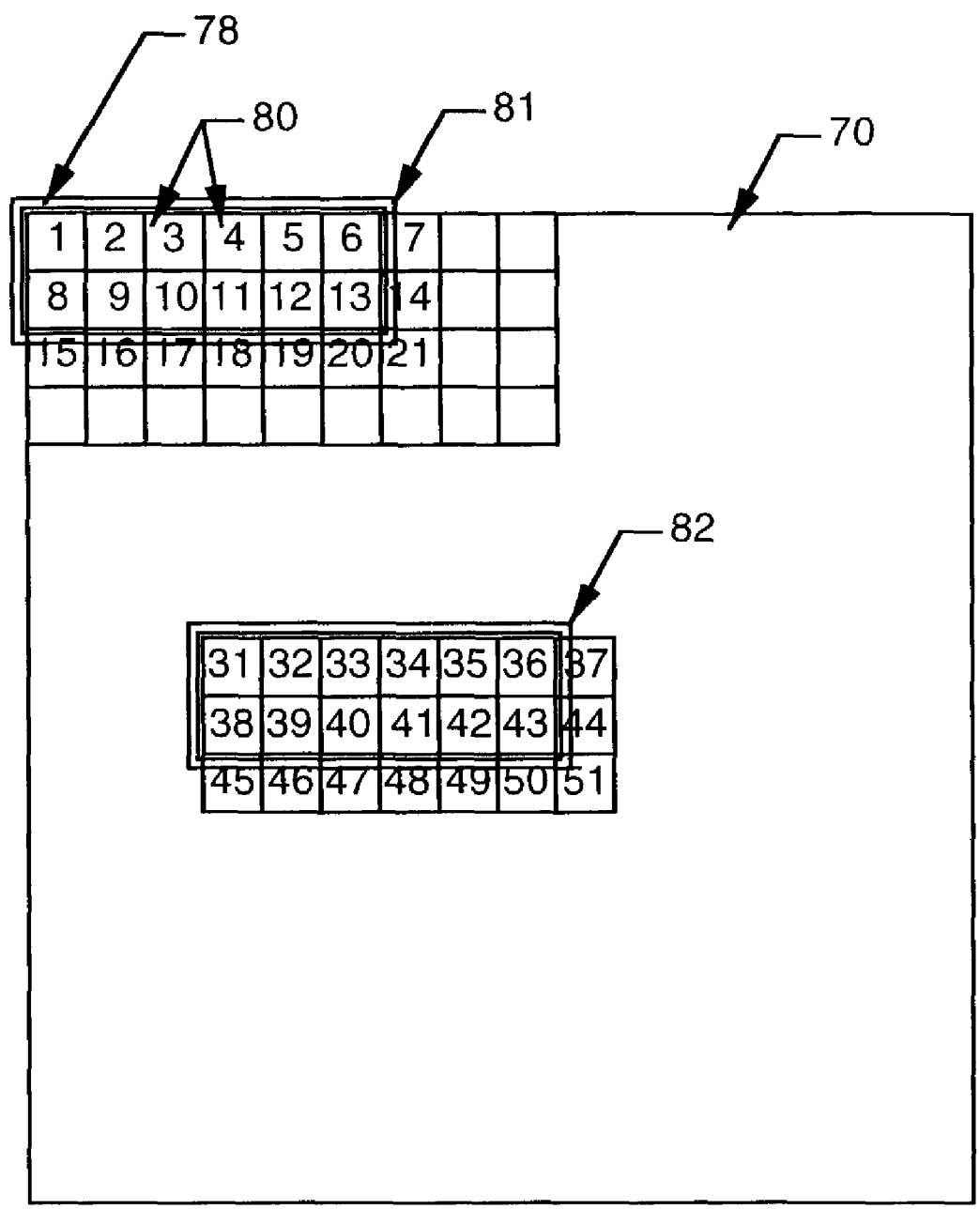
FIG. 10 illustrates blocks of data received at the PDA in an instance where the user scrolls to a new location on the present web page, demonstrating the priority of packet downloading, in accordance with Prior Art.

To explain further in detail, reference is made to FIG. 10, which illustrates a web page 70 enlarged. The web page is shown to consist of blocks of data 80 that are numbered consecutively for demonstration purposes. Blocks 80 exist across and down an entire web page in a matrix array, and span beyond the displayable area or screen 78 as shown. When a web page is loaded at the server, blocks 1, 2, 3, 4, 5, 6, 8, 9, 10, 11, 12 & 13 are sent first from the server to the PDA to be displayed, as only these blocks comprise the displayable area or screen 78. Thus, the first priority is sending data from the server to the PDA whereby the displayable area on the PDA is filled up with blocks of data.

The second priority is sending data from the server to the PDA whereby a small area around the displayable area on the PDA is filled up with blocks of data, and this is only done after the first priority is completed. To explain further in detail, reference is made again to FIG. 10, which illustrates blocks 7, 14, 15, 16, 17, 18, 19, 20 & 21 sent from the server to the PDA, to be stored in internal memory on the PDA, on the web page image displayed on the PDA, with these blocks inserted in their correct locations as they appear on the web page 70 at the server. This will facilitate scrolling of small amounts immediately at the PDA device to view the displayed image on the PDA screen so that it gives better speed to the user, and can only be done after blocks 1, 2, 3, 4, 5, 6, 8, 9, 10, 11, 12 & 13 are sent first from the server to the PDA (first priority).

The third priority is sending data from the server to the PDA whereby animation or segments of the current PDA display area that continuously change, keep getting refreshed continuously for a set period of time. The user may have the option to change this period according to the user's preference, or this may be preset at the server. With further reference to FIG. 10, blocks 3, 4 & 5, or portions thereof, may be an advertisement in which the GIF is continuously changing. Thus, as an example, blocks 3, 4 & 5 would get continuously refreshed for the first 10 seconds (if the user selects this period or it is preset at the server) as a third priority, after the first and second priorities have been completed, as defined previously. One of the reasons for continuously refreshing animation or segments of the display that continuously change for a certain period of time, is because the web page itself may not be fully rendered in the browser at the server. In this case, portions of the image on the web page for example Yahoo logos, advertisement banners or other portions of the web page, may not appear immediately as the web page is loaded at the server and is being rendered for a certain period of time, but more parts keep getting rendered during the first 10 seconds at the server (if the user selects this period or it is preset at the server) until the full page is finally rendered. This allows the portions of the web page that appear in the displayable area of the PDA at the server, to be continuously sent and refreshed at the PDA during this period, as the web page is being rendered at the browser which will take a few seconds. Therefore, as a new web page appears on the browser at the server and parts are added to it for this period until fully rendered, the image displayed on the PDA screen will also be generated in a similar fashion with parts added to it for this period. Thus, it may not be advertisements that are appearing and changing during the first 10 seconds at the server (if the user selects this period or it is preset at the server), but it may be the web page that needs to be fully rendered during this period. This period for example 10 seconds, may not be varied by the user or preset at the server, but may be determined by the browser itself. The browser is aware of how long it takes to download the entire web page and it may use from the beginning to the end of when it receives the entire web page, as the amount of time it is going to continue refreshing. Therefore the browser will refresh parts of the image on the main screen up to the end of this time as a second priority, and after this time it will either not send refreshes or send them based on a third priority protocol.

Figure 15:
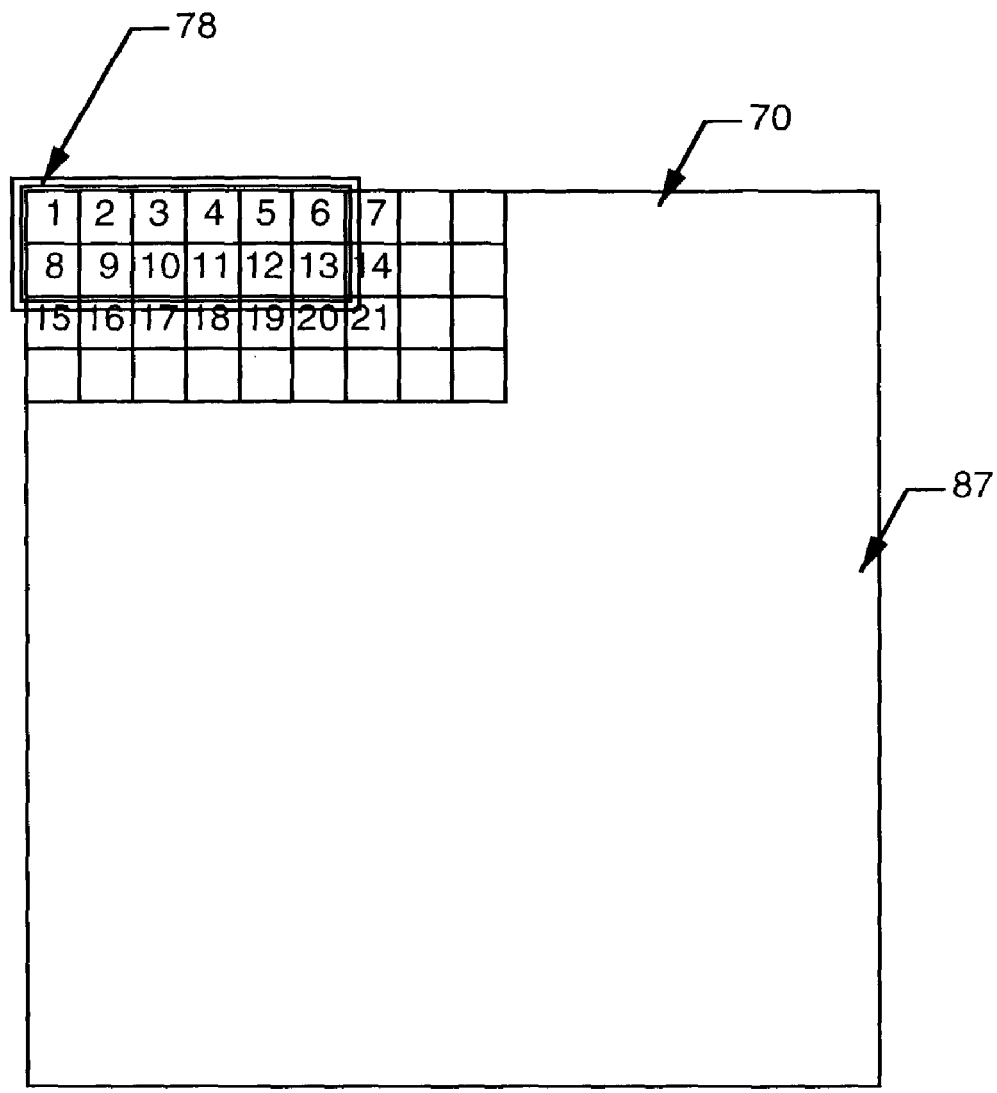
FIG. 15 illustrates activities conducted by the PDA during defined periods in accordance with priorities established, in accordance with Prior Art.

With further reference to FIG. 15 and the first priority, there exists a period "A" (which is the period previously explained which can be determined either by the user or preset at the server or determined by the browser, when the web page is fully received) whereby the browser is rendering the web page during this period, and all blocks that change on the web page within the displayable screen area will be sent from the server to the PDA to be displayed. The browser does not distinguish between animation portions such as advertisements or other parts of the web page that do not change, but sends blocks of information that comprise the display area 78 in accordance with the first and second priorities. At the end of period "A" the browser tells the server software that the web page is fully rendered. During period "A" the server checks each block in the displayable area or screen 78 at set intervals. If the last change was made to block 3 in a particular frame, the server checks each block in the display area 78 for new blocks that have changed, and if changes are made to blocks 3 and 4, the server sends block 4 first then block 3 as the priority is shifted to sending newly changed blocks that have not been changed since the previous frame. Thus, blocks are not sent twice consecutively unless there are no other changes to other blocks in consecutive frames. The set intervals at which times the server checks the display area 78 for changes to be sent to the PDA, may be done every 2 to 3 seconds or as often as the user desires or is preset at the server.

Again with reference to FIG. 15 and the third priority, after the duration "A", the animation may be disabled by the user or it may be preset at the server, as the user may not wish to see animation changes such as advertisements. Thus, the user at the PDA or the server may disable animation changes to the display area 78 to conserve on bandwidth, as animation changes consume large amounts of bandwidth. Therefore as a third priority the server will send the blocks comprising the rest of the web page to the PDA.

As a further embodiment, if animation is enabled at the browser and it is determined that animation is not to be displayed at the PDA (this may be the case when animation is disabled at the browser, nothing at all appears on the screen at the browser for that particular location, but the user would like to see at least the first still image) the first, second and third priorities are all conducted as before but with animation enabled at the browser, except that the third priority which fills the rest of the page will only send each block once and not send changes.

As a further embodiment, if the user or server has predetermined that animation is required, then the first and second priorities are conducted as before, but the third priority is changed. With animation enabled, and after period "A" has elapsed or after a few seconds more than "A" represented by "X" seconds the server would time slice blocks being sent to the PDA to fill up the larger area 87 with blocks of animation that keep changing continuously. A reduction in the rate of updating animation would conserve bandwidth and will allow other parts of the web page 70 to be transmitted simultaneously to the PDA. Thus, after "A" seconds or after "A"+"X" seconds, the server would check for changes to animation and send those blocks that have changed, then send a few blocks of the larger area 87, and alternate between these two activities in this time slice mode, until area 87 (outside 78) is completely received at the PDA.

When the user is viewing area 81 of a web page 70 of FIG. 10 and this area is filled up with blocks of data at the PDA (or even before), and the user scrolls to a new area 82, blocks of data fill up the display area 78 in accordance with the first three priorities established. This means that the server is told about the new location and priorities 1, 2, and 3 start to get conducted with this new location as the new parameter.

Another parameter that will restart the priority protocols 1, 2, and 3 is if the user clicks anywhere on the display screen. Thus, the emphasis will be on any changes to the main display when this activity occurs.

Should the user scroll to a new location on the web page image displayed on the PDA screen 78, then the PDA would immediately send information on the new location scrolled to, and the server would respond by sending those blocks that occupy the display screen of the new location to the PDA, which would be added to the web page image stored in memory on the PDA. This process would be handled as a first priority also, since the criteria for first priority is to fill up the display area on the PDA display screen. Thus, by example with reference to FIG. 10, in a first location 81 blocks of data 1, 2, 3, 4, 5, 6, 8, 9, 10, 11, 12 & 13 which only occupy the displayable area 78, are sent from the server 71 to the PDA 72 to be displayed first. Should the user 79 scroll to the new location 82 before the PDA is finished downloading and displaying blocks from the first location 81, the PDA then sends the coordinates of this new location to the server, and immediately blocks of data 31, 32, 33, 34, 35, 36, 38, 39, 40, 41, 42 & 43 which only occupy the displayable area 78 of the new location 82 are sent as a first priority in response from the server to the PDA, to be decompressed, stored into memory (on the same web page image at the PDA), and displayed on the screen 78 to the user. In an alternate embodiment, the blocks transmitted from the server to the PDA may be assembled first on the screen and then stored into memory. In a further embodiment, the blocks transmitted from the server to the PDA may be simultaneously assembled on the screen and stored into memory. As defined previously, the second priority would be for the server 71 to send blocks 37, 44, 45, 46, 47, 48, 49, 50 & 51 to the PDA, which surround the new location 82 at a fixed distance surrounding the display area 78. The number of blocks sent from the server to the PDA surrounding the display area 78 may be set at the server location. Thus, at any instant when scrolling is performed, all activities are interrupted and the first priority goes to sending blocks of data that only occupy the displayable area 78, in the portion of the web page on the server where the PDA has scrolled to, in accordance with the invention.

In an effort to conserve on bandwidth, the PDA may be set by the user to receive only a few blocks of data around the screen location 81, or alternately the server may be set to only send a few blocks of data around the screen location 81, after which no other blocks are sent to the PDA unless the user scrolls or clicks elsewhere.

As mentioned previously, in the original application Ser. No. 09/677,857, pictures contained in the image displayed in the virtual browser are compressed at the server, in different methods than the text portions and the color depth reduced by different methods than text portions before sending to the PDA device. When received by the PDA, this image is decompressed for the user to view text portions first, whereby the picture portions are displayed at a lower depth of color next, which can be done quickly, and these portions are overlaid progressively with color at higher bit depths. This enables an image to be viewed quickly without the fine details of graphics, which follow moments afterwards. Thus, picture portions of a web page are reduced in color depth at the server 71 and sent to the PDA 72, which receives and displays these graphics at a lower color depth, for example 3 bit. The fourth priority is for the color depth of the pictures displayed on the screen 78 to be increased to resemble the web page image presently rendered on the server 71. Then by example, the 3-bit color depth graphics or picture portions of the image are overlaid with 8-bit color. In particular, a web page image 70 of FIG. 10 is usually comprised of text portions and picture portions, and only the picture portions are overlaid with 8-bit color and the text portions are left in 3-bit color depth. Therefore, after the third priority of sending data from the server to the PDA whereby animation or segments of the display that continuously change, keep getting refreshed continuously for a set period of time, the color depth of the picture portions of the image displayed on the PDA screen is increased to match the web page image by being sent by the server as a fourth priority, in accordance with the invention.

Alternatively, if bandwidth reduction is required and the third priority is eliminated, then this fourth priority is conducted after the second priority. In general, a priority protocol is referred to as being a priority. This fourth priority applies to images only on the current display or at a fixed distance around the display.

For a color PDA device, the fifth priority after the picture portions are overlaid with 8-bit color (or other), is to have blocks of data sent from the server to the PDA filling up all other areas on the web page image at the PDA, which are decompressed and stored into memory in their correct locations as they appear on the rendered image at the server, in accordance with the invention. This activity, however, is not an exclusive activity and may be done in conjunction with refreshing animation or segments of the display that continuously change. Thus, this fifth priority of filling the missing blocks around the display area 78 may be time-sliced with refreshing animation or segments of the display that continuously changes. Therefore, everything that changes on the main screen becomes slower due to time-slicing. In the method of time-slicing, there would be a few blocks of data sent from the server to the PDA to fill up around the display area, then a few blocks of data which refresh areas of animation within the display area 78 are sent immediately after, in an alternating fashion until the entire web page image is received at the PDA. In another embodiment of this invention, this fifth priority of filling the missing blocks around the display area 78 may be done simultaneously with refreshing animation or segments of the display that continuously change. A possible means for accomplishing this is to use half the bandwidth to transmit each task from the server to the PDA. In a further embodiment of the invention, one byte of data is dedicated to transmitting blocks of information to fill up around the display area, and the next byte of data dedicated to refreshing animation or segments of the display that continuously change, with this procedure occurring in an alternating fashion until the entire web page image is received at the PDA. This is the same as third priority from before.

If instead of a circuit switched connection the network being used is a packet-based network where conservation of bandwidth is required, then priority three or priority five may not be sent at all, i.e. no blocks are sent to fill up the rest of the web page and the only way the user will see other parts of the web page is by scrolling out of the current display area and waiting for new blocks to be downloaded. Alternatively, the server may start to send additional blocks (which are not in the current display area), in a location determined by the direction the user starts to scroll or shows intent of scrolling towards by other means. The server may also save user preferences of certain web pages where a particular user normally likes to scroll and downloads those portions after the first and second priorities are done.

In another embodiment, the server may send no image during period "A" or "A+x" and only starts the first priority after this time has elapsed. Therefore, the current screen (or current screen plus fixed distance around current screen) would start to get downloaded after the period finishes, and all blocks would only download once.

This way the web page would be fully rendered at the browser before anything is sent to the PDA device. So, first the current screen would be sent (after this period is finished) and then a fixed distance around the current screen would be sent secondly, and in the bandwidth conserving method nothing else would be sent (no changes to the current screen or filling up the rest of the page) unless the user shows intent of scrolling out of this current screen or clicks on the current screen. If the user clicks on the current screen then the first priority shifts to sending changes on the current screen.

Figure 11:
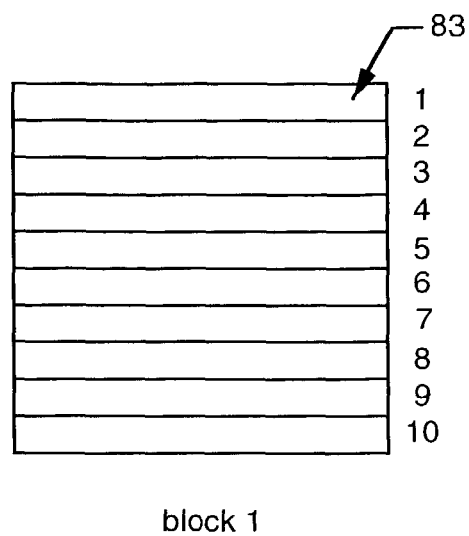
FIG. 11 illustrates the line composition of each block of data, in accordance with Prior Art.
Figure 12:
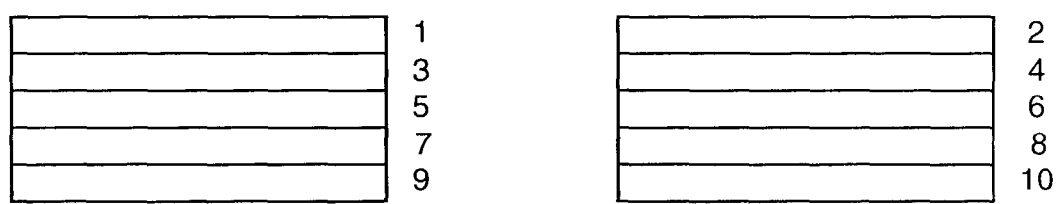
FIG. 12 illustrates the subdivision of each block of data into "a" blocks and "b" blocks which when interlaced produce the entire block of FIG. 11, in accordance with Prior Art.
Figure 13:
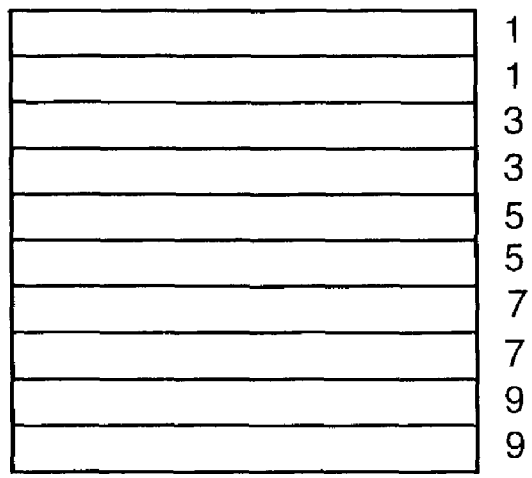
FIG. 13 illustrates a first drawing sequence of each block as the PDA receives the "a" blocks of data from the PDA, in accordance with Prior Art.
Figure 14:
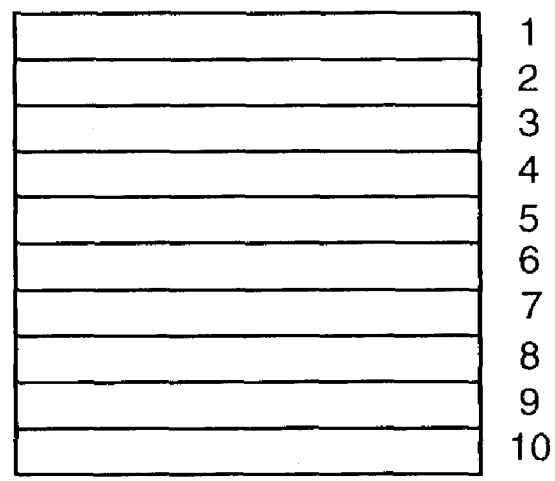
FIG. 14 illustrates a second drawing sequence as the "b" blocks are received at the PDA and inserted in their correct location, in accordance with Prior Art.

In accordance with the invention, the PDA screen 78 is comprised of a matrix array of liquid crystal dots, each dot of equal uniform size and gap between dots. The image occupying the entire PDA screen is sub-divided into blocks of data as previously described, and for demonstration purposes each block of data comprising a fixed amount of dots along its width and a fixed amount of dots along its height. The actual blocks may be variable in size and are determined by the server dynamically. Thus, for demonstration purposes and with reference to FIG. 11, block 1 (of FIG. 10) will be defined as a matrix array 10 dots wide by 10 dots high. Therefore, line 1 83 will be comprised of a linear array of 10 dots only, with 10 such lines located one below the other allocated to block 1. Each block of data may be further sub-divided into smaller blocks as depicted in FIG. 12, whereby block 1 is sub-divided into blocks 1a and 1b. Similarly, all other blocks (2, 3, 4, 5, etc.) are split into "a" and "b" sub-divisions with the "a" sub-division comprising the odd numbered lines 1, 3, 5, 7 & 9, and the "b" sub-division comprising the even numbered lines 2, 4, 6, 8 & 10, for the corresponding block. Therefore, when a web page is loaded at the server and blocks of data are transmitted to the PDA, it is the "a" sub-divisions that are sent first for all blocks of data transmitted from the server to the PDA. Thus, with further reference to FIG. 10, for the screen 78 at location 81, blocks 1a, 2a, 3a, 4a, 5a, 6a, 8a, 9a, 10a, 11a, 12a & 13a, are sent as a first priority from the server to the PDA. Since only half the data for each block of information is sent to the PDA for display by this method, the drawing sequence or display sequence is such that each line of data is drawn twice as data blocks in the "a" sub-division only contain 5 of the 10 lines of information in each block, on the display screen 78. Otherwise, each displayed block will have alternating lines missing or blank, making the displayed image on the PDA screen difficult to recognize. Therefore, with further reference to FIG. 13, the first drawing sequence or display sequence for block 1 will be to display lines 1, 1, 3, 3, 5, 5, 7, 7, 9, & 9 in this order from top to bottom, in which the "a" lines are temporarily repeated. By this method, only half the data for each block is sent from the server to the PDA to have a very fast display time on the PDA, though the image will appear "blocky" as alternate lines of information comprising the display for each block will be missing and replaced. This condition is only temporary, as at a later time, for the screen 78 at location 81, blocks 1b, 2b, 3b, 4b, 5b, 6b, 8b, 9b, 10b, 11b, 12b & 13b are sent from the server to the PDA, and the "a" lines which are temporarily repeated in each block are then replaced with these new "b" lines for each block. Blocks 1a and 1b are combined to produce the final display of block 1, as each contains only half the display lines, and this process is repeated for each block on the PDA display. These fully reconstructed blocks are then stored in memory on the PDA device. Thus, block 1 of the display screen will now be comprised of lines 1, 2, 3, 4, 5, 6, 7, 8, 9 & 10 as illustrated in to FIG. 14, which is the second drawing sequence or display sequence for block 1. This method of interlacing blocks of data enables the user to view a web page with very little delay from the server, though at first it may not be very clear as alternate lines of information are replaced, enabling the user to have a preview of the web page at a display speed much faster than if all lines of each block were transmitted at once from the server. This is one method of sending interlaced images, and there may be other methods of sending a lower information content block and add on the rest of the information at the next step.

In accordance with priorities established in the invention, and with further reference made to FIG. 10 for the screen 78 in location 81, when the image to be displayed on the PDA screen is sent from the server, blocks 1a, 2a, 3a, 4a, 5a, 6a, 8a, 9a, 10a, 11a, 12a & 13a are sent as a part of the first priority. Next, blocks 1b, 2b, 3b, 4b, 5b, 6b, 8b, 9b, 10b, 11a, 12b & 13b are sent from the server to the PDA to complete the first priority, and these "b" blocks are interlaced with corresponding blocks in the "a" sub-division previously sent. Thus, it is important to have the image of what the user views as close to perfect before any other areas are sent, in accordance with the first priority of the invention. Afterwards, and in accordance with priorities previously established, blocks 7a, 14a, 15a, 16a, 17a, 18a, 19a, 20a & 21a which surround the display area 78, are sent from the server as part of the second priority. This will allow the user the opportunity to scroll a little outside the display area almost immediately, without having to wait the time it takes for the entire blocks surrounding the display to be sent to the PDA. Subsequently, blocks 7b, 14a, 15b, 16b, 17b, 18b, 19b, 20b & 21b are sent to the PDA to complete the second priority, and these "b" blocks are interlaced with corresponding blocks in the "a" sub-division previously sent. In further detail as an example, with the screen 78 in location 81, as the first string of blocks 1a, 2a, 3a, 4a, 5a, 6a, 8a, 9a, 10a, 11a, 12a & 13a are sent from the server to the PDA, and the user scrolls to a new location 82 before blocks 1b, 2a, 3a, 4a, 5b, 6b, 8b, 9b, 10b, 11b, 12b & 13b are sent, then immediately blocks 31a, 32a, 33a, 34a, 35a, 36a, 38a, 39a, 40a, 41a, 42a & 43a which only occupy the new displayable area are sent from the server to the PDA. Sending blocks 31a, 32a, 33a, 34a, 35a, 36a, 38a, 39a, 40a, 41a, 42a & 43a will now be treated as a first priority (as this is the area the user wishes to view), and these are followed by blocks 31a, 32a, 33a, 34a, 35b, 36b, 38b, 39b, 40b, 41b, 42b & 43b sent from the server to the PDA to complete the first priority, and these blocks are interlaced with corresponding blocks in the "a" sub-division previously sent. Next, blocks 37a, 44a, 45a, 46a, 47a, 48a, 49a, 50a & 51a which surround the new location 82 of the display area are sent from the server to the PDA, in accordance with a part of the second priority. To complete the second priority, corresponding blocks 37b, 44a, 45b, 46b, 47b, 48b, 49b, 50b & 51b are sent from the server to the PDA, and these blocks are interlaced with corresponding blocks in the "a" sub-division previously sent. As a third priority animation or segments of the display that continuously change get refreshed in a similar manner, with the "a" sub-divisions sent first from the server and the "b" subdivisions sent immediately after, to be interlaced in a similar fashion. The fourth priority of increasing the color depth follows immediately after. The fifth priority however, would be to next send the "b" subdivisions to the first area 81 which was first presented to the user before the scrolling action. Thus, blocks 1b, 2a, 3a, 4a, 5b, 6b, 8b, 9b, 10b, 11b, 12b & 13b are sent from the server to the PDA, and this is followed by all surrounding areas, with the "a" sub-divisions sent first from the server and the "b" subdivisions sent immediately after, to be interlaced in a similar fashion thereby completing the web page image stored into memory on the PDA.

In accordance with another embodiment of the invention, and with reference to FIG. 9, blocks of data 84 are transmitted from the server 71 to the PDA 72, through the cellular phone infrastructure. Inside the cellular phone infrastructure there is a large pipe, and the blocks that are sent from the server to the PDA are inside this pipeline. The pipeline 85 for transmitting blocks of data is quite large, and as a result there is a significant lag or delay in time between sending a particular block at the server and receiving it at the PDA. Because of this there are many blocks in the pipeline at the time a particular block is sent from the server, and the blocks in the pipeline must be removed or received before that particular block is received at the PDA. In particular, a situation may occur whereby blocks 1, 2, 3, 4, 5, 6, 7 & 8 may be sent form the server and only block 1 is received at the PDA after block 6 is sent from the server, due to the significant lag or delay in the pipeline. The PDA must then transmit an acknowledgement for each block received, otherwise the server has no information on any blocks that may not be successfully received, decompressed and displayed on the PDA screen. Should there be any missing blocks or blocks that can't be displayed successfully, then the server would reschedule such blocks to be sent again next into the pipeline, as no acknowledgement for such blocks would be received at the server. One problem with this arrangement is the lengthy delay in any rescheduled block being received at the PDA, as many other blocks in the pipeline must be received and acknowledged by the PDA before the rescheduled block is received, acknowledged and put in its correct location. This problem of a lengthy delay also exists when the user clicks to a new web page, as many blocks from the old web page already in the pipeline need to be removed from the pipeline or received by the PDA before any new blocks representing the new web page are received at the PDA. To significantly reduce such a lengthy delay, the number of blocks transmitted in the pipeline is limited to a smaller quantity, say 3 blocks instead of 6 blocks for demonstration purposes only. Thus blocks 1, 2 & 3 are sent from the server to the PDA, and the server waits for acknowledgement of block 1 from the PDA first, before sending block 4. If no acknowledgement is sent for a particular block within a designated time period, then the server assumes this block is not successfully received, decompressed and displayed at the PDA, and automatically reschedules this block for sending next in the pipeline. By example, ideally blocks 1, 2 & 3 are sent first from the server to the PDA, then an acknowledgement for block 1 must be received at the server first before block 4 is sent to the PDA. After the acknowledgement for block 2 is received at the server, then block 5 is sent, etc., so the acknowledgements are not behind by more than 3 blocks from what was sent. This system quickens the response time for displaying a new image significantly, without having to wait for many packets or blocks to be cleared from the pipeline first.

Also, in accordance with the invention, the priority of downloading data to the PDA changes if the user clicks anywhere on the display screen 78. For example, the main screen display area is already downloaded and displayed on the PDA screen, and the remaining blocks surrounding the display area are being downloaded, and the priority has already changed from refreshing animation to putting blocks around the display area time-sliced with animation changes. Thus, everything that changes on the main screen becomes slower due to the time-slicing operation, but if the user clicks on an area that requires input such as a title box, the present display mode is too slow for such a situation. Therefore, any click on the parts of the web page displayed on the PDA screen 78 that invoke a change to the image displayed on the screen (since the PDA sends a message to the server as to where the click down occurred), the priority of downloading information changes to give first priority to filling up the display area on the PDA with any new image, thereby receiving the full bandwidth for this operation instead of time-slicing. After the display area is filled up, the other priorities follow as previously described. This is particularly useful for text entry so the user may see what text was entered without any lengthy delay, and also for menu items on the page.

To conserve on bandwidth consumption, the server monitors the activities of the user from messages sent back from the PDA on user activities such as scrolling, clicking or text input. Thus, after a pre-set duration (which is user adjustable), the server may stop sending new blocks of information (as a means of bandwidth conservation) on any particular web page transmitted to the PDA if there is no response from the PDA on these user activities. Unless the user shows intentions of moving out of the display area from such user activities, bandwidth conservation is engaged in accordance with the invention.

A similar mode exists to conserve on bandwidth for areas that require animation changes, in accordance with the present invention. The server will send no blocks of data after a time-out period, which is user adjustable or preset at the server. This is usually a few seconds, and is particularly useful in instances where the animation changes are for an advertisement, in which the user has no interest. Thus, in this mode of bandwidth conservation, the only changes to the display image would occur if the user scrolled outside the presently displayed image, or clicked or typed in an area, which invokes a change to the displayed image.

Figure 16:
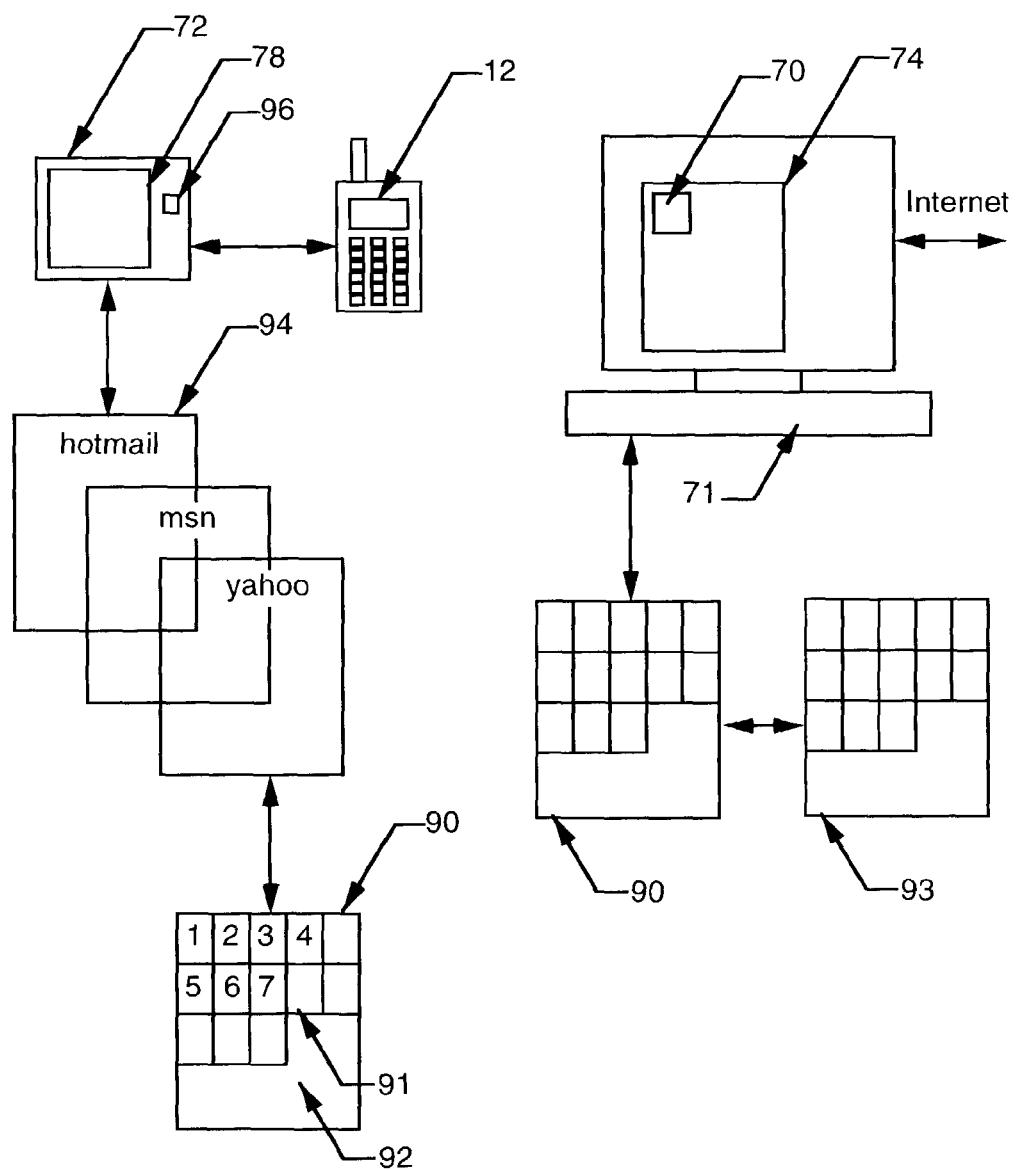
FIG. 16 illustrates back pages or previously viewed web pages stored in the PDA's cache memory and on the server, in accordance with the present invention, in accordance with the present invention.

The principle embodiments of the present invention relate to methods of reducing the amount of data sent from the server to the PDA device, through the cellular phones infrastructure's pipeline. Most cellular phone providers charge users by the amount of data sent or received by the phone, thus it is of particular importance to reduce the amount of data received by the cellular phone, and downloaded by the PDA to minimize the user's cost. A first embodiment draws reference to FIG. 9, whereby blocks of data 84 are transmitted from the server 71 to the PDA 72, through the cellular phone infrastructure. Inside the cellular phone infrastructure there is a large pipe 85, and the blocks of data 84 that are sent from the server to the PDA are inside this pipeline as previously explained. With further reference to FIG. 16, a server 71 contains a browser 74 on which a particular web page 70 is displayed. The displayable area or screen 78 of the PDA is much smaller than the entire web page 70 and only this area 78 is sent from the server to the PDA after the web page is fully rendered on the browser, to conserve on the amount of data sent through the cellular phone 12. The portion of the web page image on the browser 74 sent to the PDA may be a little larger than the screen 78, and this would facilitate a little scrolling outside the displayed area, as previously explained.

In another embodiment of the present invention and with further reference to FIG. 16, the web page image 70 which is displayed on the browser 74 is frozen so that animation or moving parts of the image are captured as a single frozen frame after the web page is fully rendered on the browser, and only this single frame sent once to the PDA without further animation changes, as a means of conserving the amount of data sent through the cellular phone. Thus the server takes a copy of a single frame snapshot, and sends this to the PDA with no further changes to any of the pixels on the web page 70, which is sent from the server to the PDA, even if there are ongoing animation changes on this web page. The web page must be received and rendered first by the browser at the server, and only after this is done then the image is frozen and sent to the PDA. Should the user type text, or click somewhere on the displayable area or screen 78 of the PDA, then the single frozen frame unfreezes at the browser. The reason why the single frozen frame unfreezes is so that the user may see the text entered in the appropriate location, or a drop down menu can only be viewed if the display becomes unfrozen. Thus, in this case after the single frozen frame unfreezes at the browser, only the changes with the frozen web page image are immediately sent to the PDA. If however, the user clicks on a location where there is no link or no action to be taken by the browser, which means that there is no change to the image viewed on the PDA or at the browser, then in a further embodiment the browser is intelligent enough not to unfreeze that frame and leave it the way it is, therefore no further image is sent from the server to the PDA. Otherwise, the browser would unfreeze the frame for a certain period of time and no further image sent to the PDA, if there is no animation on that part of the screen that the user is currently viewing, but if there is animation present, then for a period of say 5 to 10 seconds there would be animation sent to the PDA, and there would be some small amount of data received by the cellular phone and PDA. Also, the user may use this as a means to unfreeze the single frozen frame viewed on the PDA for a short while, if the user needs to see some animation or a refreshment of the current screen. So, the user may just click on a location where there is no link and for a period of say 5 to 10 seconds, the user's display continues to get refreshed, and after that the web page image is frozen again on the PDA screen, as before. If the user clicks on a link to a new web page then that new web page image is sent to the PDA. However, if the user scrolls to different parts of the web page image, the image remains as a single frozen frame.

In a further embodiment of the present invention and with reference again to FIG. 16, the web page image 70, which is displayed on the browser 74, must be completely downloaded and rendered first on the server 71, before any data is sent to the PDA. If data is sent to the PDA without the web page fully rendered at the browser, then as the web page is being rendered at the browser and if there is a shift in the web page or a part of the web page changes, this results in the same image being sent more than once to the PDA, and this increases the amount of data sent to the cellular phone or PDA. Thus to minimize the amount of data sent to the PDA through the cellular phone in this particular embodiment, the web page is fully rendered at the browser first, then a single frozen image frame or snapshot is taken whereby no pixels change in this frame, which is then sent to the PDA in blocks of data, as previously explained. Nothing other than the frozen image frame is sent from the server to the PDA even if there are further animation changes to the web page on the server's browser. Should the user type text, or click somewhere on the displayable area or screen 78 of the PDA, then the single frozen frame unfreezes on the PDA display screen for a certain period of time, as previously explained.

In accordance with another embodiment of the present invention and with further reference to FIG. 16, the PDA stores many back pages or previously viewed web pages 94 in its cache memory, and these web page images are also stored in memory on the server. Thus, if the user clicks on the back button on the PDA device, or if the user types in the URL of a web page that has been viewed before and is presently stored in the PDA's cache memory, the server actually instructs the PDA on which back page 94 to go to as it knows exactly where each back page is stored on the PDA's memory banks and also how much data was downloaded for each web page image. Some web pages 90 may only have data occupying a portion 91 of the web page, but the server keeps track of how much data was sent to the PDA for each web page, in particular what segments or blocks of the web pages were sent to the PDA, so that in the event the user scrolls outside these areas, the server knows to send the PDA information on the new area scrolled to.

In a further more sophisticated embodiment of the present invention, the back pages 94 stored in memory on both the PDA 72 and server 71 may not look exactly as the actual web page at different times, since most web pages are modified or updated with time. Thus, with further reference to FIG. 16, the present back page 90 stored on the PDA only has data on area 91 sent for that particular web page, and data on area 92 has not been received or downloaded by the PDA. Hence, when the user clicks on the back button on the PDA or types in a URL of a web page that is stored in the PDA's cache memory, the server gets a new refreshed web page from the Internet which is rendered completely then a single frozen image frame or snapshot 93 is taken whereby no pixels change in this frame. The server also has in its memory a mirror image of all the blocks or parts web page images stored in the PDA's cache memory, since it is the one sending this information to the PDA, so as it sends information to the PDA it also stores in its own cache memory. The server checks to see if this web page the user clicked onto is presently stored in the PDA's cache memory, then if the back page is in cache, the server takes the new snapshot 93 and takes a copy of the back page image 90 stored in the PDA's cache memory, and performs a correlation analysis between these two web page images. Thus the server first compares which blocks of data or parts of the image are exactly the same, each block at a time in sequence, and instructs the PDA to copy parts or blocks of the image that are not the same into its cache memory. Hence, if blocks 1, 2, 3, 4, & 5 are the same between the stored web page image on the PDA's cache memory and the new snapshot 93 from the Internet, then only these blocks are kept in the PDA's cache memory, copied from the PDA's cache memory, decompressed and displayed on the screen. Therefore, what this means is that instead of the server sending blocks 1, 2, 3, 4, & 5 to the PDA, it just sends an instruction telling the PDA to copy blocks 1, 2, 3, 4, & 5 from the cache memory of the PDA, decompress and display to the user. However, if blocks 6 & 7 are different for the same web page image, then the server sends these different blocks to the PDA, which replaces the older blocks with newer blocks 6 & 7 in its cache memory, and also decompresses and displays these newer blocks 6 & 7 on the screen 78. All blocks 1 to 7 received from the server for a particular web page image are stored in compressed format in the PDA's cache memory. This method allows a refreshed version of a back page stored in the PDA's cache memory to be displayed without having to send the entire web page again to the PDA unless it has completely changed, only sending parts that have changed, with the amount of data sent from the server substantially reduced in some cases. If the user scrolls beyond the area 91 that was sent and stored in cache memory for a particular web page image 90, the server will realize that these parts of the image are not in the PDA's cache memory, as the cache memory of the PDA is mirrored on the server, and the server will send the blocks of data for the new part of the web page image scrolled to, also instructing the PDA to store these blocks of data in its cache memory, which is stored in compressed format. Blocks of data representing the new area scrolled to are copied from the cache, decompressed and displayed on the screen.

In another improved more sophisticated embodiment of the present invention, a flash memory 96 is provided in the PDA which is capable of storing a large amount of back pages or previously viewed web pages 94, to store for example 20 web pages, in compressed format. The flash memory 96 stores only the downloaded content of each web page image sent by the server to the PDA, so some web page images would be partially complete as the user may not have stayed long enough or scrolled to all parts of the web page, in order to have the entire web page image downloaded. The server 71 also stores all the same web page images as the PDA 72 in its flash memory in compressed format, and the server also knows what all of these web pages are. For example with reference again to FIG. 16, one web page may be MSN, another may be Yahoo, and another may be Hotmail, and those web pages are stored in a database linked with that particular user at the server location. Thus each user would have its own database at the server containing all the compressed web page images, the same as those stored on the PDA, and at the start of each session when the user starts up the PDA, this database or the image bank associated with the user is taken by the server and copied from a database server into the virtual machine 23 of FIG. 4 running on the server. Thus at the start of each session, the server knows the content and names of the last 20 web pages sent to the PDA and the stored location of each web page image in the PDA's flash memory 96, and which blocks or parts of the image have been previously downloaded to the PDA. The server would have pointers to each web page stored in the PDA's flash memory (for example page 1, page 2, . . . , page 20). Therefore, if the user goes to a web page in a recent or previous session, for example the Yahoo web site, the server knows the Yahoo web page was sent in the previous session by checking the database for this particular user, and the server immediately retrieves a new Yahoo web page 93 from the Internet. The server would also retrieve from memory the previously sent Yahoo web page image 90 stored on the PDA, and would perform a correlation analysis on the two web pages to determine which portions or blocks of the web page image that have changed and need to be sent to the PDA, to replace these parts in cache memory and to be displayed in the display area 78. Thus, the server only performs the correlation analysis after the user chooses to go to a web page previously viewed and still stored in the PDA's flash memory. Many parts of certain web pages such as headers or title bars remain the same for a certain period, and there is no need to send the same information again, especially if the user is a frequent visitor to such web sites, and this would result in a saving of perhaps 20% to 30% of data to be sent to the PDA.

Figure 17:
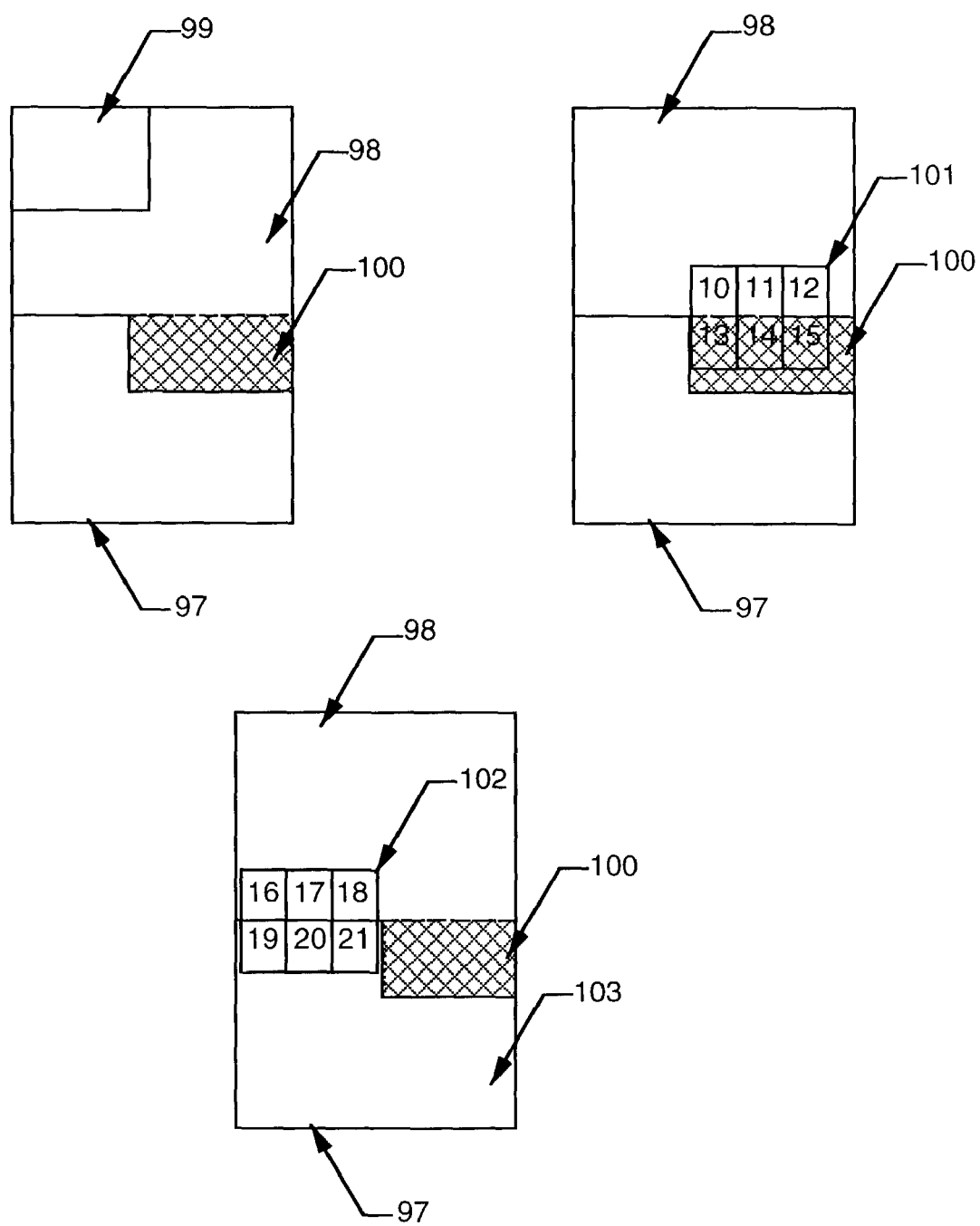
FIG. 17 illustrates the user scrolling to parts of the web page, parts of which contain new and old information, in accordance with the present invention.

In a further embodiment of the present invention, and with reference to FIG. 17, the web page image 97, which is stored on the PDA's cache memory, and also mirrored on the server's memory, only had areas 98 and 100 sent by the server and stored in both the PDA and server. Now, when the user clicks onto this back page the server gets a refreshed web page image from the Internet, and if for example area 98 contains the same information as the refreshed web page image but area 100 contains different information from what is stored on the PDA's cache memory, then this different information will be sent to the user if the user scrolls to the area 100. Thus, if the user has clicked onto back page 97 and is presently viewing in location 99 which is displayed on the PDA display screen, and this area 99 is within area 98 which does not contain any new or different information than what is in the PDA's cache, then the server instructs the PDA to copy all blocks of data occupying area 99 from its cache and display to the user. However, if the user scrolls to location 101 which is partially in areas 98 and 100, then the server instructs the PDA to take blocks 10, 11 & 12 in area 98 which does not contain any new or different information than what is in the PDA's cache, copy from cache, decompress and display. Then the server instructs the PDA to take blocks 13, 14 & 15 within area 100 containing new information, and replace these with older blocks for the same location in its cache memory, copy from cache, decompress and display also to the user. If the user then scrolls to location 102, which is partially in area 98 and also in area 103 which is a new area, and information on this new area 103 never sent to the PDA before, then the server would instruct the PDA to take blocks 16, 17 & 18 in area 98 which does not contain any new or different information than what is in the PDA's cache, copy from cache, decompress and display. The server also recognizes blocks 19, 20 & 21 from this new area 103 were never sent to the PDA before, and sends these blocks to the PDA instructing it to take these blocks and store into cache memory, and also decompress and display also on the PDA screen. Thus, blocks from both areas 98 & 103 would be displayed on the PDA screen, for location 102.

Figure 18:
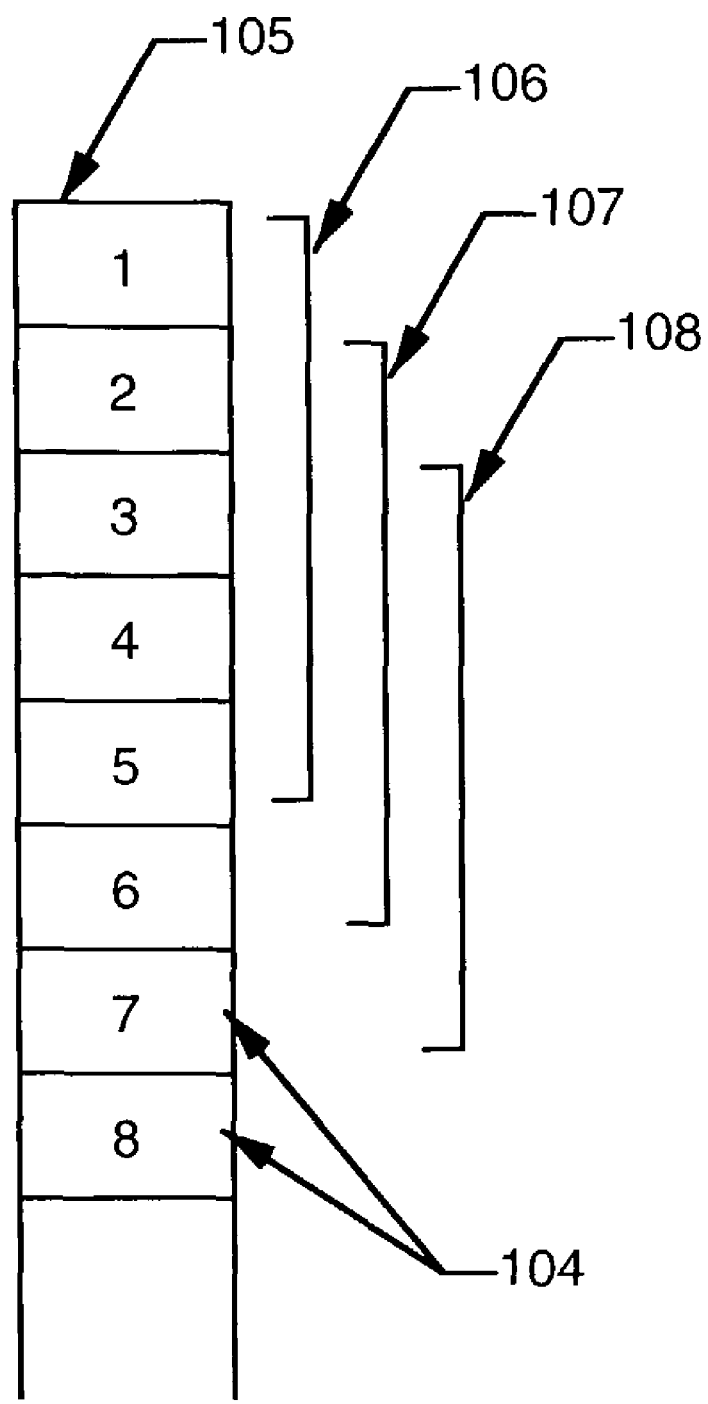
FIG. 18 illustrates memory allocation in cache, in accordance with the present invention.

In accordance with other embodiments of the present invention, the cache memory of the PDA is mirrored on the server, and the server decides what is stored in the PDA's cache. There is a limit to the cache size (perhaps 1 or 2 megabytes) thus the server has various algorithms to determine what priority to store web page images in the PDA's cache. Thus, in one particular embodiment of the invention, the priority for storing web page images on the PDA's cache memory is first in first out, even if a particular web page is visited many times. For example, if the cache memory only has the capacity to store 5 web page images, then with reference to FIG. 18, web pages images 104 are stored in the cache memory 105 in sequence as they are received by the PDA. Thus, 1 represents the first and oldest web page image stored on the PDA's cache memory, with 2 being the next web page image received after 1. With a capacity to store 5 web page images (by example), only group 106 (comprising web page images 1, 2, 3, 4 & 5) is stored in cache memory on the PDA. In this particular embodiment the web page images stored in cache may be the same or different. With the cache memory almost full after receiving web page image 5, and the user has clicked onto a new web page (which may or may not be already stored in the cache), then the server sends this new web page image 6 to be stored in the PDA's cache memory 105. Since web page image 1 is the oldest one in cache memory, it is first removed to provide room to store the web page image 6. Thus, web page image 2 becomes the oldest web page image in the new group 107 of 5 web page images (2, 3, 4, 5, & 6) stored in the PDA's cache. Hence the PDA's cache only stores the 5 most recent web page images received from the server, in this particular embodiment. Similarly, if a new web page image 7 is sent by the server (which may or may not be already stored in the cache), web page image 2 will be removed from cache and room is provided to store web page image 7. A new group 108 will be created and stored in cache comprising 5 web page images 3, 4, 5, 6 & 7, with 3 being the oldest web page image stored in cache.

In a further embodiment of the present invention, the server monitors and keeps track of the most visited web pages for each user over a period (for example one month), and stores web page images on the PDA's cache in priority based on the most frequently visited sites. Thus, if the user visits a web site the most in this one month period, this particular web page is kept the longest in cache memory, with the second most visited web site kept the second longest in cache, and so on.

In a more sophisticated embodiment of the invention, a weight factor is applied to each web page image stored in the PDA's cache memory based on how frequently each web page is visited by the user, and also when each web page was last visited. Hence, the criteria used by the server to instruct the PDA on which web page image to remove from cache memory, is determined from a combination of the weight factor on how often each web page was visited and how long ago visited.

In another embodiment of the invention, the server keeps track of the segments or parts of web pages most frequently viewed by the user over a period (for example one month). A priority of saving web pages in the limited cache memory on the PDA is established based on the parts of web pages most frequently visited by the user. Thus, if the user frequently visits a certain part or parts of a particular web page, then only these part(s) are stored in cache with the most frequently visited stored the longest in cache over this period. Also, the blocks or parts of the image that are stored in the PDA's cache memory are also dependent on how often they are visited by the user. Therefore, if the user visits the Yahoo web page (for example) very often, which may measure about 10 PDA screens in length, and if the user scrolled to the bottom once in a month although most of the time only the first screen shown for that web page is the only area viewed by the user, who clicks out of that web page most of the time, then since the Yahoo page was scrolled to the bottom once, it would be stored in its entirety for a long period in the PDA's cache, as the user frequently visits this web page. When the cache memory becomes full and the server has to decide what is to be removed from cache, then blocks from this Yahoo web page and other web pages that are not viewed frequently would be removed to provide storage capacity in the cache even if the web page is visited frequently. Hence, not only are web pages not frequently visited removed from cache, but also parts of web pages stored in cache are also removed if not viewed often or if it has been a long time since they have been visited, to provide storage capacity in the PDA's cache.

In another embodiment of the present invention, a further means of reducing the amount of data sent to the PDA is to throttle or reduce the speed of sending. Even though the bandwidth available for transmitting and receiving data may be large, throttling to a slower rate of data sending is the preferred method of reducing the amount of data received and sent by the PDA, for this embodiment. The user may be given the full bandwidth of data transmission for a certain period of time. However, there may be circumstances where the amount of data the user receives must be limited over a period of one month (for example). Assuming each user is expected to use the PDA an average of 15 hours per month, the server monitors the download pattern of the PDA, and if the user in the first 3 hours has taken substantially more than one fifth of the total Megabytes allotted, the server determines that the user has taken too much and from now on gives the user less. There are two ways the server does this, first by increasing the amount of time it takes for the PDA to receives a web page, which will reduce the amount of data sent to the PDA over a period. Secondly, by reducing the bandwidth, the amount of data sent to the PDA is also reduced. So, if the web page is normally transmitted at 15 kilobits per second, it will be transmitted at 7 kilobits per second for a certain period of time. As the user approaches the expected consumption rate, the data transmission rate will catch up to the normal rate. Thus, the user does not exceed the total Megabytes allotted over a set period of time.

What is claimed:

1. A host computer which receives information from an outside source, contains a browser with a window which renders and freezes the information onto a virtual display in its memory, wherein a software program reduces the color depth of the virtual display, compresses the virtual display and sends it to a remote device capable of receiving, decompressing, storing into memory and displaying it to a user on a display screen, wherein if the user clicks on the display screen or enters text on the remote device, the display is unfrozen at the browser and the virtual display sent again to the remote device only if the information has changed.

2. The device as claimed in claim 1 such that:
   if the user clicks on the display screen or enters text on the remote device, the display is unfrozen at the browser and the virtual display sent again to the remote device with all moving parts.

3. The device as claimed in claim 1 such that the virtual display must be completely downloaded and rendered first on the host computer, before any information is sent to the remote device.

4. The device as claimed in claim 1 such that:
   the remote device saves information in a cache memory and the host computer also saves into memory the same information sent to the remote device, and where in memory it is stored on the remote device;
   if the user instructs the remote device to display previously viewed information, the host computer is informed by the remote device and would instruct the remote device what to display and where this information is located in cache memory;
   if the information the user wants to view has changed at the outside source, the host computer would send the parts of information that have changed to the remote device to be stored in cache and displayed;
   the host computer uses algorithms to decide what information is stored in cache memory on the remote device.

5. The device as claimed in claim 1 such that the host computer may vary the rate at which information is sent to the remote device or vary the time taken to send information to the remote device.

* * * * *